(12) United States Patent
Kmita et al.

(10) Patent No.: US 10,071,692 B2
(45) Date of Patent: Sep. 11, 2018

(54) PICKUP TRUCK ROOF RACK SYSTEM

(71) Applicant: JAC Products, Inc., Saline, MI (US)

(72) Inventors: Gerard J. Kmita, Allen Park, MI (US); Brandon T. McMahan, Pontiac, MI (US); Noel v. Ranka, Canton, MI (US); Jeffrey M. Aftanas, Ortonville, MI (US); Gerald Gomes, Pontiac, MI (US); Michael R. Makin, Pontiac, MI (US)

(73) Assignee: JAC Products, Inc., Saline, MI (US)

( * ) Notice: Subject to any disclaimer, the term of this patent is extended or adjusted under 35 U.S.C. 154(b) by 47 days.

(21) Appl. No.: 15/084,121

(22) Filed: Mar. 29, 2016

(65) Prior Publication Data

US 2016/0288724 A1    Oct. 6, 2016

Related U.S. Application Data

(60) Provisional application No. 62/140,186, filed on Mar. 30, 2015.

(51) Int. Cl.
| | |
|---|---|
| *B60R 9/00* | (2006.01) |
| *B60R 9/05* | (2006.01) |
| *B60R 9/08* | (2006.01) |

(52) U.S. Cl.
CPC . *B60R 9/05* (2013.01); *B60R 9/08* (2013.01)

(58) Field of Classification Search
CPC .... B60R 9/05; B60R 9/06; B60R 9/08; B62D 33/0207; B60P 3/40; B60Y 2200/14
USPC ..................................... 296/3; 224/403, 405
See application file for complete search history.

(56) References Cited

U.S. PATENT DOCUMENTS

| | | | | | |
|---|---|---|---|---|---|
| 4,770,458 | A | * | 9/1988 | Burke | B60R 9/00 224/405 |
| 4,984,837 | A | * | 1/1991 | Dise | B60P 7/00 224/309 |
| 5,393,114 | A | * | 2/1995 | Christensen | B60R 9/00 248/558 |
| 5,494,327 | A | * | 2/1996 | Derecktor | B60P 3/40 224/321 |
| 5,584,521 | A | | 12/1996 | Hathaway et al. | |
| D394,639 | S | * | 5/1998 | Carter | D12/406 |
| 5,806,905 | A | | 9/1998 | Moore | |
| 6,056,176 | A | * | 5/2000 | Aftanas | B60R 9/045 224/309 |

(Continued)

*Primary Examiner* — Peter Helvey
(74) *Attorney, Agent, or Firm* — Harness, Dickey & Pierce, P.L.C.

(57) ABSTRACT

The present disclosure relates to an article carrier system particularly adapted for use with a pickup truck. The system employs a first pair of support tracks secured to a roof surface of a pickup truck, and a rear spoiler portion coupled to each of the first support tracks and extending therebetween adjacent a rear area of the roof surface. A second pair of support tracks is secured to a pair of truck bed sidewalls. A combination spoiler/support subsystem is supported from the second pair of support tracks and is adjustably positionable to provide a variable spacing between the rear spoiler portion and the spoiler/support subsystem, to thus tailor the system to support articles of various lengths thereon. The rear spoiler portion and the spoiler/support subsystem provide an appearance of a single, integrated spoiler when positioned closely adjacent one another.

20 Claims, 31 Drawing Sheets

(56) References Cited

U.S. PATENT DOCUMENTS

| | | | | |
|---|---|---|---|---|
| 6,641,201 | B1* | 11/2003 | Pietryga | B60J 7/041 |
| | | | | 296/100.01 |
| 6,913,175 | B2* | 7/2005 | Martin | B60R 9/00 |
| | | | | 224/403 |
| 6,983,968 | B2* | 1/2006 | Brauer | B62D 33/0207 |
| | | | | 224/405 |
| 7,014,236 | B2 | 3/2006 | Kerns | |
| 8,668,125 | B2 | 3/2014 | Williams | |
| 9,586,629 | B2* | 3/2017 | Leitner | B62D 33/0207 |
| 9,771,028 | B2* | 9/2017 | Finestone | B60R 9/06 |
| 2002/0036412 | A1* | 3/2002 | Bareket | B60P 3/40 |
| | | | | 296/3 |
| 2004/0134953 | A1* | 7/2004 | Perez | B60P 3/40 |
| | | | | 224/403 |
| 2005/0023314 | A1* | 2/2005 | Williams | B60P 3/40 |
| | | | | 224/405 |
| 2006/0163300 | A1* | 7/2006 | Kramer | B60R 9/00 |
| | | | | 224/405 |
| 2016/0090048 | A1* | 3/2016 | Crandall | B60R 9/06 |
| | | | | 224/403 |
| 2017/0066384 | A1 | 3/2017 | Finestone | |

* cited by examiner

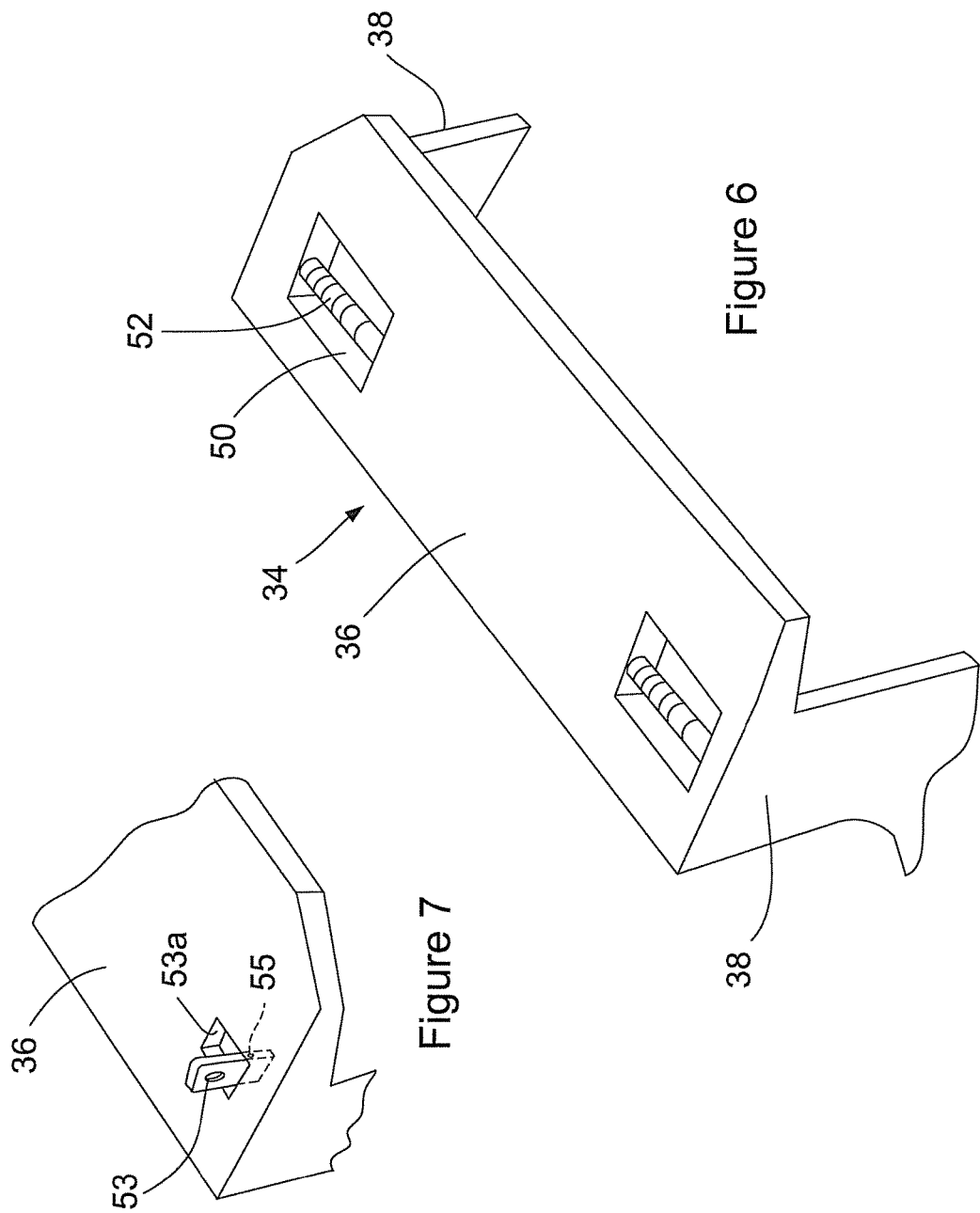

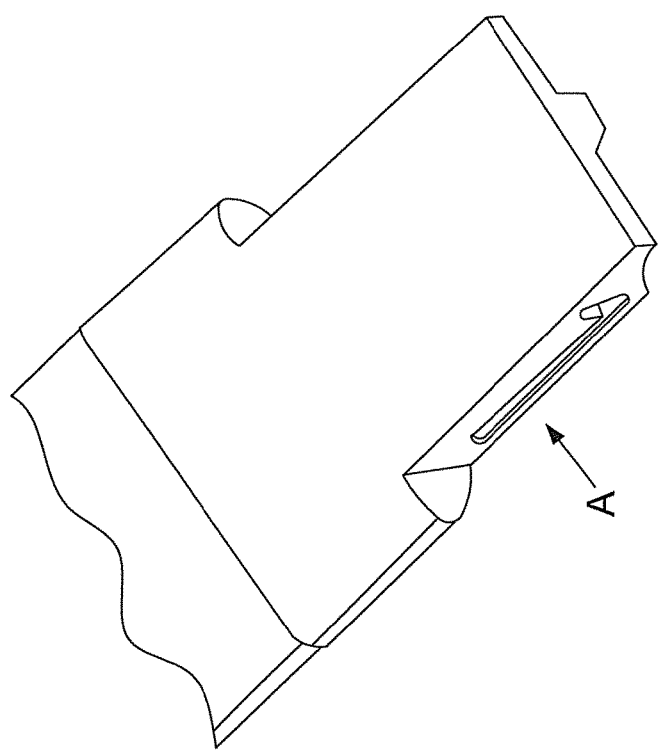
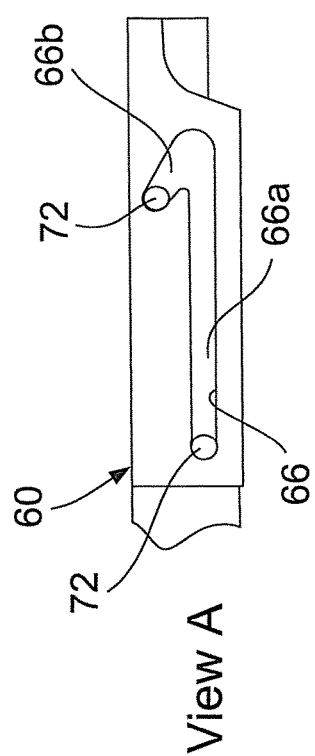
Figure 9

PICKUP TRUCK ROOF RACK SYSTEM

CROSS REFERENCE TO RELATED APPLICATIONS

This application claims the benefit of U.S. Provisional Application No. 62/140,186, filed on Mar. 30, 2015. The entire disclosure of the above application is incorporated herein by reference.

FIELD

The present disclosure relates to roof rack systems, and more particularly to a roof rack system especially well adapted for use on a pickup truck, and which can be configured into a plurality of configurations for transporting elongated articles such as ladders, kayaks, surfboards, canoes, building materials such as conduits and wood trim, etc., at least partially above the cab of a pickup truck.

BACKGROUND

The statements in this section merely provide background information related to the present disclosure and may not constitute prior art.

The wide range of utility provided by pickup trucks has contributed to their popularity of ownership and use by individuals as a daily driver vehicle in recent years. And of course pickup trucks have been extremely popular for many years as critically important vehicles for use with various types of businesses, particularly those associated with construction and the building trades.

Pickup trucks are ideally suited to carrying items that are too large to place in the interior of a large SUV or van. However, when carrying elongated items such as ladders, kayaks, canoes, building materials such as elongated metal piping or conduit, or long lengths of wood trim, specialized components have generally needed to be used with a pickup truck to allow convenient transport of such elongated items. The foregoing mentioned items are often too long to be simply placed in the bed of a pickup truck and transported with the tailgate of the vehicle lowered. More typically, some type of external support system, for example a ladder rack, may need to be installed in the bed of the vehicle. Such a rack is typically desirable because it allows at least a portion of the length of such articles, and sometimes a majority of the length of such articles, to be transported while positioned above the cab of the vehicle. In this way the articles either do not project at all past the tailgate, or they will project to a much lesser degree beyond the tailgate. However, such external ladder style racks typically require tubular vertically oriented support members to be non-removably mounted in the bed, and these can often consume valuable usable space within the bed. Since they are typically non-removably mounted, they will consume space in the bed even when the ladder rack is not being used to transport articles. Still further, such ladder racks are not always well suited to transporting especially long recreational items such as kayaks and canoes because such items often will still need to be positioned on the ladder rack uprights such that they extend an unacceptably long distance behind the tailgate of the pickup truck.

Simply placing a conventional article carrier rack, which typically includes a pair of cross bars, on the roof of the cab of a pickup truck may not be an ideal solution for transporting especially long items such as ladders, kayaks, canoes, etc. This is because the relatively short longitudinal length of the cab often does not allow for sufficient longitudinal spacing for the support cross bars, which will be supporting the elongated articles thereon, to securely support the elongated articles.

SUMMARY

In one aspect the present disclosure relates to an article carrier system particularly adapted for use with a pickup truck. The system comprises a first pair of support tracks secured to a roof surface of a pickup truck and extending longitudinally along the roof surface. A rear spoiler portion is coupled to each of the first support tracks and extends therebetween adjacent a rear area of the roof surface. A second pair of support tracks is secured to a pair of truck bed sidewalls of the pickup truck and extends longitudinally along the bed sidewalls. A combination spoiler/support subsystem is supported from the second pair of support tracks and adjustably positionable along the second pair of support tracks to provide a variable spacing between the rear spoiler portion and the spoiler/support subsystem. This enables a user to thus tailor the system to support articles of various lengths thereon. The rear spoiler portion and the spoiler/support subsystem further form an appearance of a single, integrated spoiler when the spoiler/support subsystem is positioned adjacent the rear spoiler portion.

In another aspect the present disclosure relates to an article carrier system particularly adapted for use with a pickup truck having a roof and a truck bed, with the truck bed having a pair of parallel truck bed sidewalls which help to form the truck bed. The system comprises a first pair of support tracks secured to the roof and extending longitudinally along the roof. Each support track of the first pair of support tracks includes a rearward, downwardly projecting portion which extends downwardly toward a respective one of the truck bed sidewalls, and which has a first contour. A rear spoiler portion is coupled to each of the first support tracks and extends therebetween adjacent a rear area of the roof surface. A second pair of support tracks is secured to a pair of truck bed sidewalls of the pickup truck and extends longitudinally along the bed sidewalls. A combination spoiler/support subsystem is supported from the second pair of support tracks and adjustably positionable along the second pair of support tracks to provide a variable spacing between the rear spoiler portion and the spoiler/support subsystem, to thus tailor the system to support articles of various lengths thereon. The combination spoiler/support subsystem has side wall portions which each have a second contour complementary to the first contour, and which enable the side wall portions to be positioned closely adjacent the rearward, downwardly projecting portions of the first pair of support tracks. The rear spoiler portion and the spoiler/support subsystem thus form the appearance of being a single, integrated spoiler when the spoiler/support subsystem is positioned next to the rear spoiler portion.

BRIEF DESCRIPTION OF THE DRAWINGS

The drawings described herein are for illustration purposes only and are not intended to limit the scope of the present disclosure in any way.

FIG. 6 is an enlarged perspective view of another embodiment of the rear spoiler/support subsystem showing a pair of cylindrical rods that can be built into the spoiler portion of the subsystem to enable external mounting accessories associated with, for example, bicycle racks, kayak carriers, etc. be attached thereto;

FIG. 7 is a perspective view of another embodiment of the rear spoiler/support subsystem showing how a flip up tie down/shoulder element may be pivotally mounted within a recess in the upper wall portion;

FIG. 9 is a side view of just the housing of the end support;

DETAILED DESCRIPTION

Figure 1:
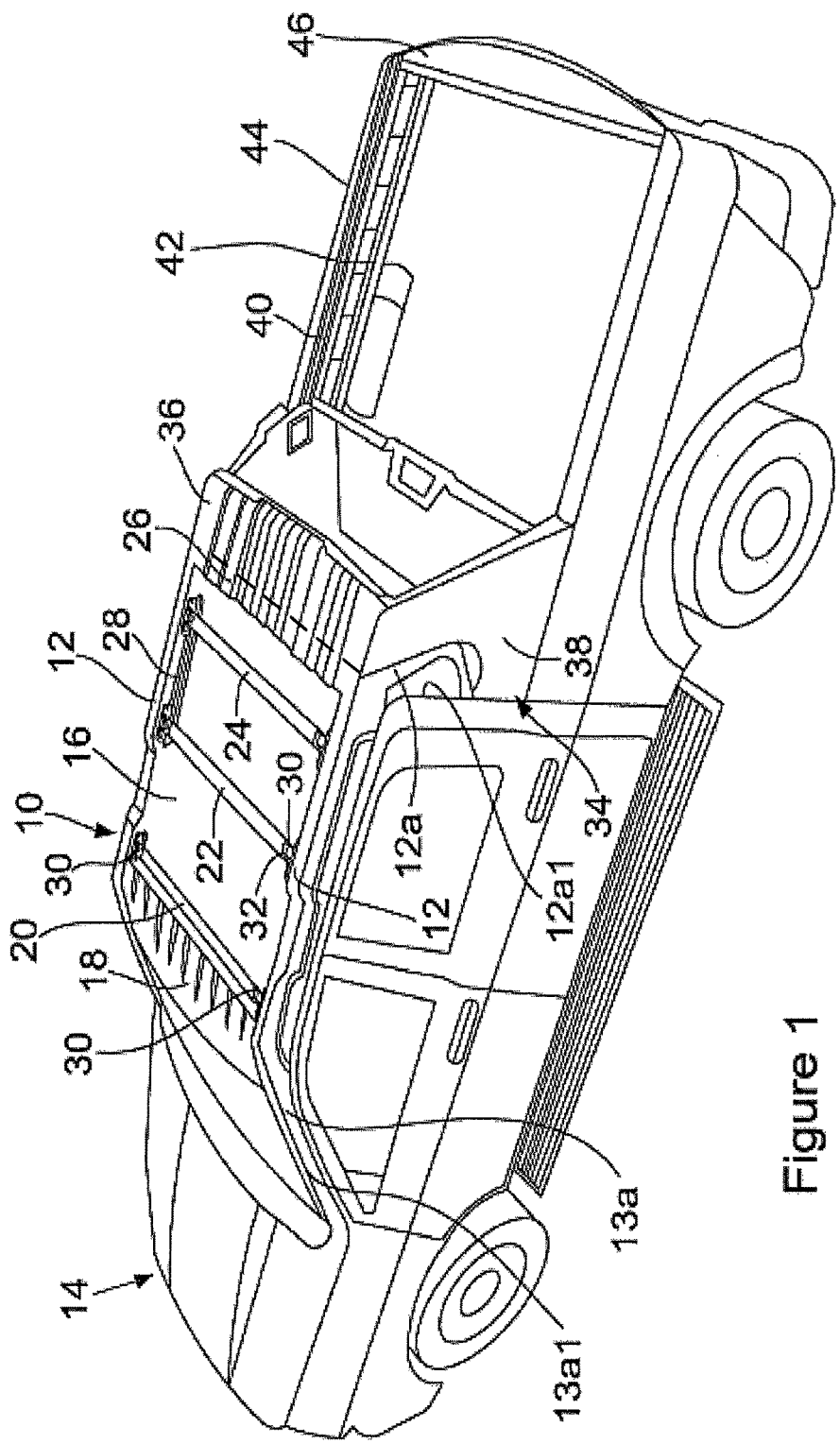
FIG. 1 is a perspective view of one embodiment of a roof rack system for a pickup truck in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a pickup truck roof rack system 10 in accordance with one embodiment of the present disclosure is shown. For convenience, the pickup truck roof rack system 10 will be referred to throughout simply as the "system 10".

The system 10 includes a pair of support rails 12 mounted fixedly to an outer body surface 16 (e.g., roof surface) of a vehicle 14, which in this example is a pickup truck, to extend along a major longitudinal axis (i.e., lengthwise) of the vehicle. The support rails 12 have forward portions 13a which extend down along each of the A-pillars of the vehicle 14. The forward portions 13a include slots 13a1 through which a bungee cord or other form of article tie down strap may be inserted and used to help secure articles on the system 10.

A front air dam 18 may be removably or fixed secured to the support rails 12, between the support rails 12, to help direct air aerodynamically over the system 10 when the vehicle 14 is moving. A plurality of cross bars 20, 22 and 24 may be secured between the support rails along with a member forming a rear spoiler portion 26. While three cross bars 20-24 are shown in FIG. 1, it will be appreciated that the system 10 could incorporate a greater or lesser number of cross bars, and that the use of three cross bars is only meant to illustrate one possible configuration of the system 10. The rear spoiler portion 26 has a generally flat rear edge portion 26a which extends adjacent to a rear edge of the outer body surface 16, and which is supported above the outer body surface 16 generally parallel to the outer body surface 16, and also generally parallel to the rear edge of the outer body surface 16.

Each cross bar 22 and 24 is mounted on support tracks 28 which are in turn fixedly secured to inside surfaces of the support rails 12. In FIG. 1 only one of the support tracks 28 is visible. The support tracks 28 essentially form inwardly opening C-shaped tracks which receive an end support 30 of each cross bar 22 and 24. Front cross bar 20 may be secured to shorter lengths of support tracks, which may otherwise be identical to support tracks 28, or it may be secured directly to the inner surface of each one of the support rails 12. The support tracks 28 allow the two rearwardly positioned cross bars 22 and 24 to be adjustably positioned at different longitudinal positions along the length of the support tracks 28, to thus allow the user to tailor the positioning of the cross bars to best support various articles of different shapes and dimensions.

It is also a significant benefit that the cross bars 20-24 are each disposed slightly below an upper surface of the support rails 12 and coplanar or slightly below the front air dam 18, when positioned in their "stowed" positions. This significantly improves the aerodynamics of the system 10 when the vehicle 14 is in motion, and particularly when travelling at highway speeds. Although even in their stowed positions as shown in FIG. 1, the cross bars 20-24 may still be used to support articles thereon.

Figure 2:
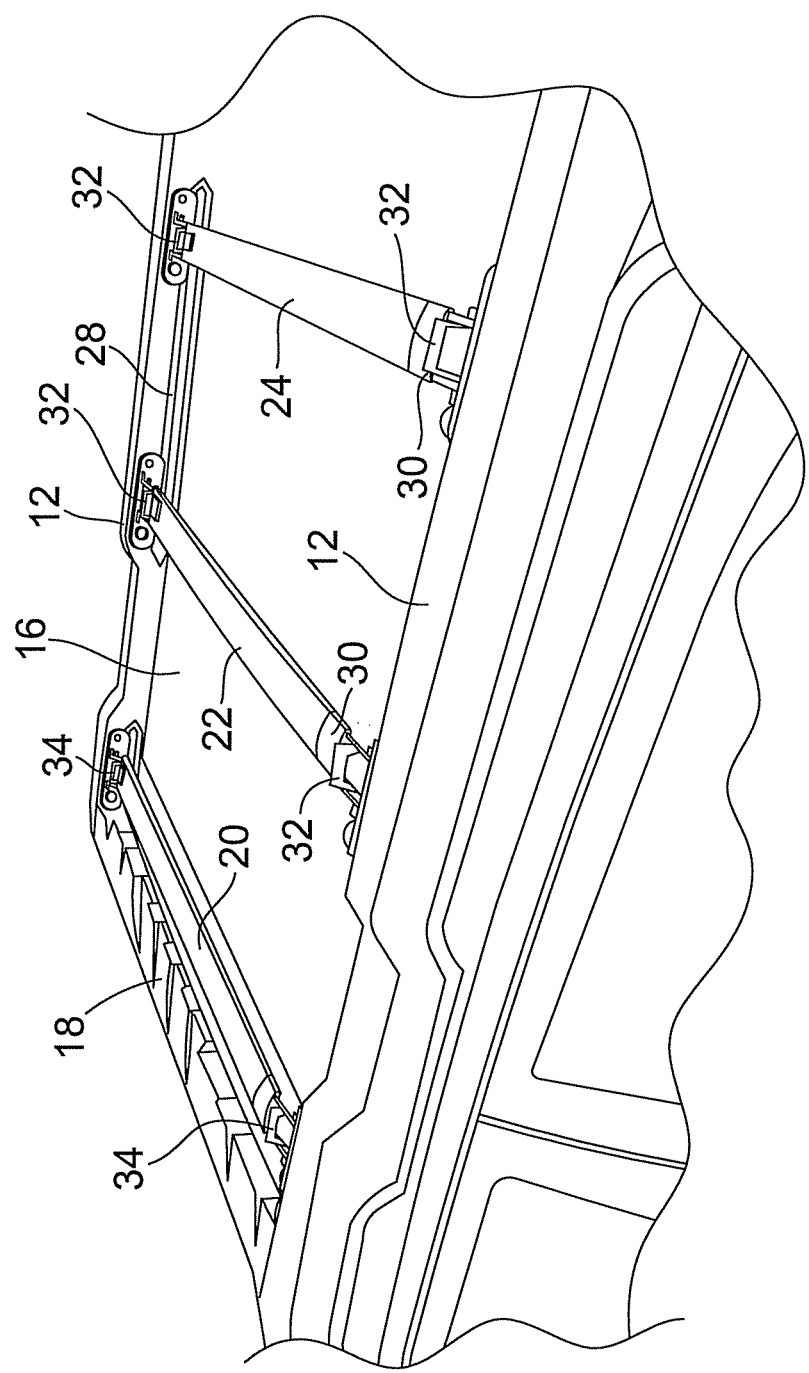
FIG. 2 is an enlarged perspective view of a portion of the roof rack system of FIG. 1 showing in greater detail the support rails, front air dam and cross bars, with the cross bars shown in their lowered (stowed) orientation.
Figure 3:
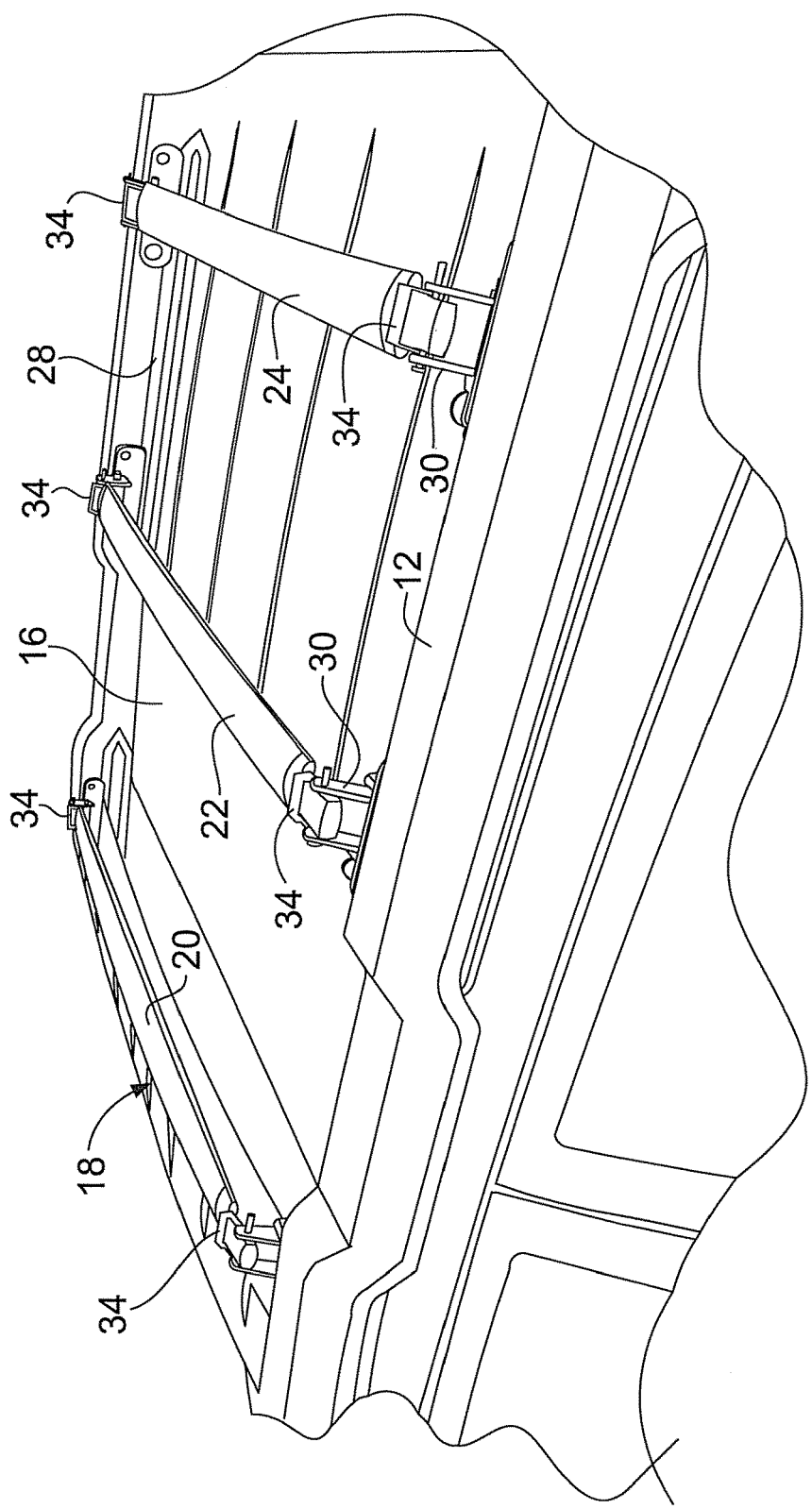
FIG. 3 is a perspective view showing the cross bars of FIG. 2 in their raised (operative) orientation.

Referring to FIGS. 1-3, the end support 30 of each cross bar 20-24 includes a lever 32 that may be lifted to enable its associated cross bar 20-24 to be articulated and locked into an elevated position just slightly above the upper surfaces of the support rails 12. When placed in their elevated positions, the cross bars 20-24 can be used to support articles thereon above the front air dam 18 and the rear spoiler portion 26; in other words articles of shapes and dimensions that might otherwise interfere with the support rails 12, the front air dam 18 and the rear spoiler portion 26. It will also be appreciated, however, that a wide variety of other side rail and cross bar configurations could be implemented in place of the support rails 12 and the cross bars 20-24. For example, fully removable cross bars that are attached in a stowed position on a given side rail using threaded fasteners at both ends of the cross bar, which threadably engage with threaded bores at spaced apart ends of the side rail, and which allow the cross bar to be re-secured in an operative configuration by threaded attachment to both ones of a pair of side rails, could just as readily be implemented. Cross bars designed to pivot at one end from one of the side rails, between stowed and operative configurations, could also be implemented. The assignee of the present disclosure has a wide range roof rack systems that could be implemented in connection with the present system 10, and therefore it will be understood that the system 10 is not limited to use with only one specific form of roof rack system. Specific roof rack systems of the assignee of the present disclosure that may be incorporated into the system 10, for example and without limitation, are shown in U.S. Pat. Nos. 8,028,875, 6,811,066 and 7,066,364, the disclosures of each of which are hereby incorporated by reference into the present application.

Figure 1A:
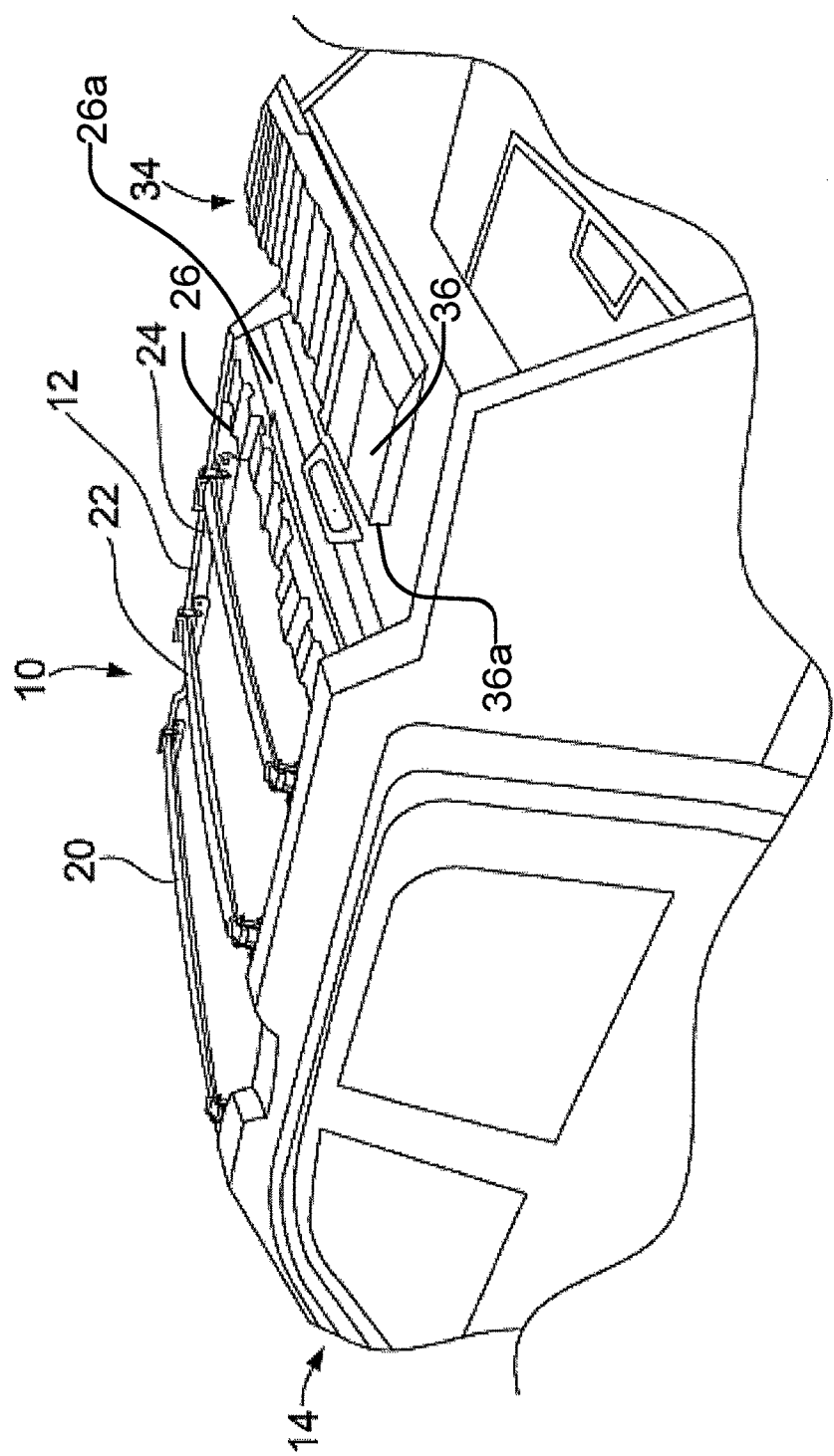
FIG. 1a is a view of the rack system of FIG. 1 but with a rear spoiler/support subsystem moved to an extreme rearward position of the bed of the pickup truck.

An important feature of the system 10 is a longitudinally positionable, rear spoiler/support subsystem 34 (hereinafter simply "subsystem 34"). Subsystem 34 includes an upper wall portion 36 having a generally flat forward edge portion 36a, which forms a spoiler portion, and a pair of side wall portions 38 that are shaped to blend in with rearward downwardly projecting portions 12a of the support rails 12 to provide the appearance of a single, integrated roof rack system. The side wall portions 38 of the subsystem 34 are each mounted on, and thus supported from, longitudinal tracks 40. The tracks 40 are in turn mounted on the inside walls 42 of a bed 44 of the vehicle 14. This allows the entire subsystem 34 to be slid rearwardly toward the rear end of the bed 44 adjacent a tailgate 46 of the vehicle 14. The subsystem 34 is shown configured in its rearward most position in FIG 1a.

Each of the rearward downwardly projecting portions 12a of the support rails 12 may be formed to include an opening 12a1 through which a bungee cord or other form of article securing member or strap may be inserted to help secure an article or load to the system 10.

Figure 4:
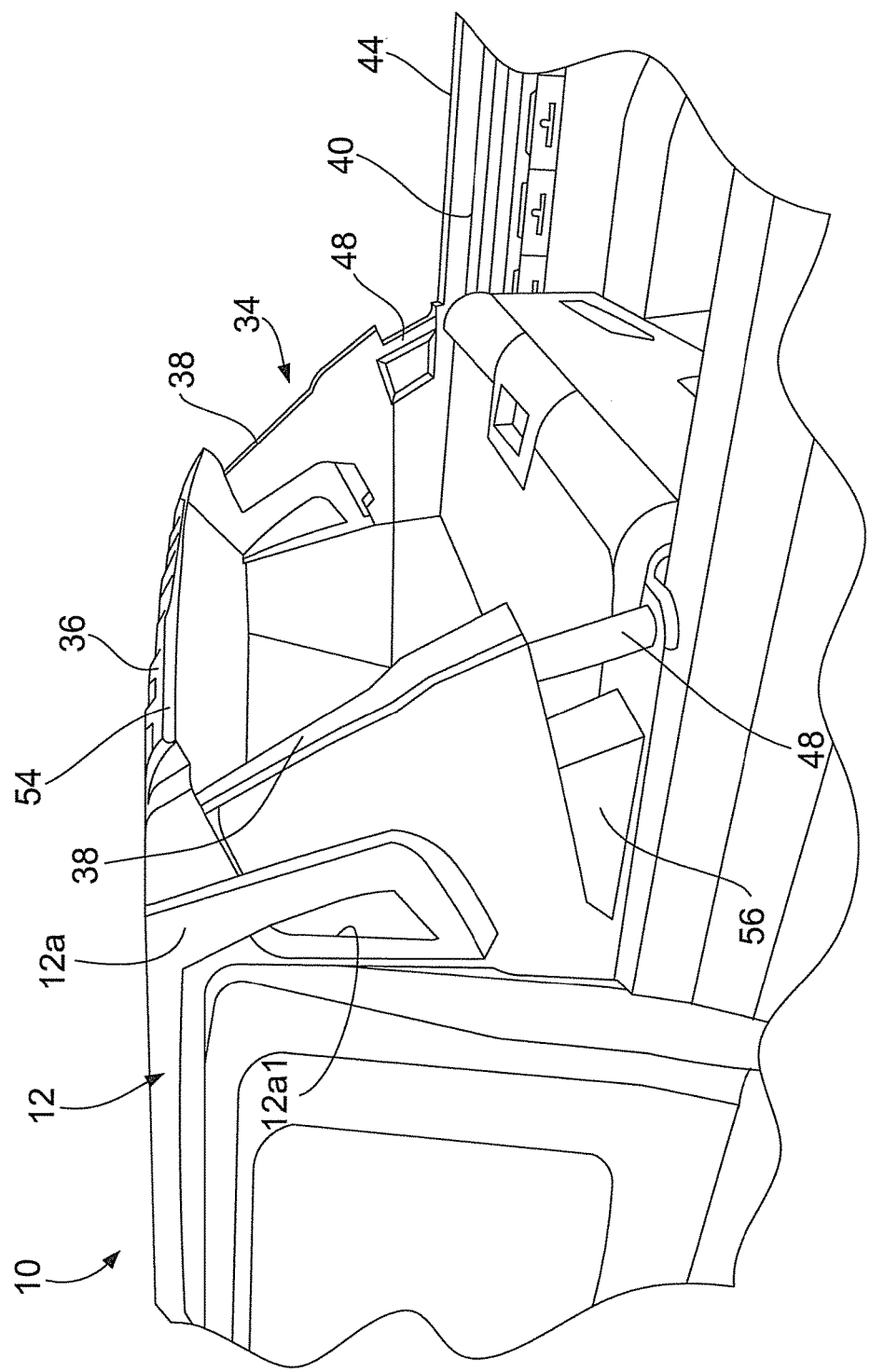
FIG. 4 is an enlarged perspective view of the rear spoiler/support subsystem of the roof rack system of FIG. 1.

Referring to FIG. 4, the subsystem 34 can be seen in even greater detail. The subsystem 34 may incorporate grab rail portions 48 by which the entire subsystem 34 may be manually urged along the support tracks 40 to be positioned as needed to accommodate especially long articles. Grab rail portions 48 may incorporate a single sided, twist lock/release feature, which will be described in greater detail in the following paragraphs. Essentially, the single sided twist lock/release feature enables the user to grab either of the grab rail portions 48 and apply a twisting motion, similar to what would be done with a typical motor cycle throttle, which releases a locking mechanism associated with the supports (not visible in FIG. 4) which are engaged with the support tracks 40. When either one of the grab rail portions 48 is twisted in one motion in a first rotational direction (e.g., either clockwise or counterclockwise), this simultaneously releases both of the locking mechanisms associated with the supports and allows the entire subsystem 34 to be slid either rearwardly or forwardly along the support tracks 40 to a new position in the bed 44. Releasing the grab rail portion 48 causes the locking mechanisms at both supports to be simultaneously re-engaged in a locking orientation on the support tracks 40. Thus, the user is able to quickly and easily unlock and slide the entire subsystem 34 to a new position simply by grasping and twisting either one of the grab rail portions 48. As such, unlocking of the subsystem 34 and adjustable positioning and movement thereof can be easily accomplished from one side of the vehicle 14 by a single individual.

The ability to space the subsystem 34 at or near the rearward area of the bed 44 enables particularly long or elongated articles to be easily and securely supported on the system 10. In this regard, and with reference to FIG. 6, it will be appreciated that the subsystem 34 may optionally incorporate one or more pockets or structures 50 formed in the upper wall portion 36, which include short portions of cylindrical or elliptically shaped elements 52, that external article carrier accessories (kayak carriers, etc.) may be attached or clamped to. It will be appreciated that a wide variety of other structures or elements may be integrated into the upper wall portion 36, or possibly even on the side wall portions 38, as needed to meet the needs of a specific application.

FIG. 7 illustrates a pivotally mounted, flip-up tie down/shoulder element 53 that may be mounted in a recess 53a in the upper wall portion 36 of the subsystem 34 via suitable pivot pin 55. The flip-up tie-down shoulder element 53 enables bungee cords or other article restraining straps to be secured thereto, as well as functioning as a lateral "stop" or shoulder to help maintain articles from shifting laterally on the upper wall portion 36 when secured thereto via external bungee cords or other like straps. It will be appreciated that the flip-up tie-down shoulder element 53 could also be constructed such that it presents a suitable surface or structure to which external article carrier mounting brackets or like components can be attached, once the element 53 is manipulated into its raised position.

Figure 5:
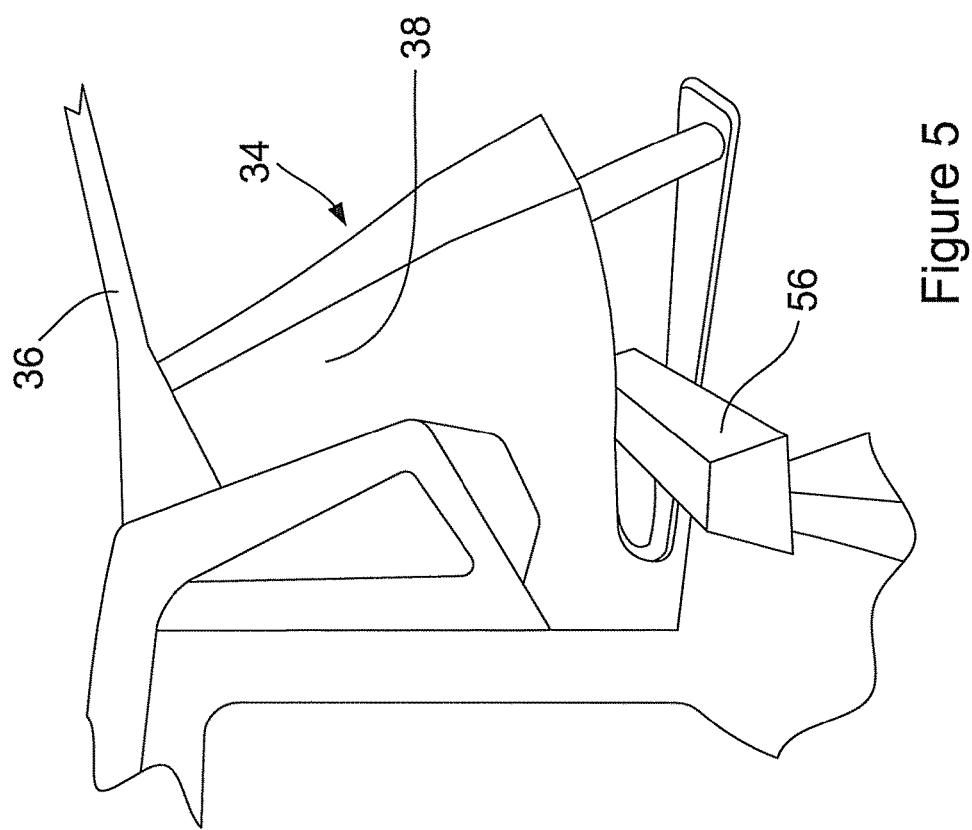
FIG. 5 is an enlarged perspective view of a portion of the rear spoiler/support subsystem showing a pivotally mounted lighting portion pivoted out into its operative position, to provide auxiliary lighting for various tasks.

It will also be appreciated that reflective elements or various forms of lights, such as LED light bars, may be incorporated into the system 10 at various locations. With reference to FIG. 4, it can be seen that reflective material 54 in this example is incorporated into the upper wall portion 36. Lighting portions 56 of the subsystem 34 may each also be pivotally supported in the side wall portions 38 and may incorporate one or more LED lighting systems. When pivoted to its outermost position, as shown in FIG. 5, each of the lighting portions 56 provides auxiliary lighting that is useful for various activities associated possibly with hunting or camping, or for use at work sites or construction sites where additional lighting is helpful for various tasks. Alternatively, or in addition to the lighting capability, speakers may be included in the lighting portions 56. On/off buttons (not shown) may also be incorporated at each lighting portion 56 so that each may be turned on and off independently, and possibly without even requiring the vehicle ignition to be turned on.

Referring to FIGS. 8-11, one of the end supports 30 can be seen in greater detail. It will be appreciated that while in this example, all the end supports 30 used with cross bars 20-24 are identical in construction, they need not be identical. With specific reference to FIG. 8, the end support 30 includes a housing 60, a base 62 and an actuating lever 64. The housing 60 has a groove 66 extending completely through the housing. The groove 66 has a linear portion 66a and a short v-shaped, upwardly turned section 66b. A terminal end of the housing 60 includes a projecting stop portion 68. The housing 60 also has a notched or narrowed end portion 70. A slide pin 72 extends completely through the groove 66 in the housing 60 and may be secured via a threaded nut 74 such that it is not removable, but still able to slide along the groove 66.

The actuating lever 64 has a graspable portion 76 and a pair of parallel projecting arm portions 78. The arm portions 78 have aligned slide holes 80 and pivot holes 82. The slide holes 80 receive the slide pin 72 which non-removably secures the actuating lever to the housing 60. The arm portions 78 each also have a stop portion 83, which forms somewhat of a projecting tab or shoulder, which limits pivoting upward and rotational movement of the actuating lever 64 when the user pulls upwardly on the graspable portion 76. The pivot holes 82 are secured to threaded bores 84 in the base 62 via threaded shoulder bolts 86. In this manner actuating lever 64 can rest flush (i.e., generally co-planar) with the longitudinal length of the housing 60 when the housing is in its stowed or non-deployed orientation, and yet easily lifted upwardly by grasping the graspable portion 76 and pivoting it about the shoulder bolts 86. As shown in FIG. 9, when the actuating lever 64 is in the lowered position, the slide pin 72 is positioned at one extreme end of the linear portion 66a of the groove 66 (i.e., to the far left in FIG. 9). When the actuating lever 64 is fully raised, the slide pin 72 may be manipulated into a terminal end of the V-shaped, upwardly turned section 66b of the groove 66. The weight of the cross bar 24 and the end support 30 in general help to hold the housing 60 in the V-shaped, upwardly turned section 66b of the groove 66 once the actuating lever is manipulated into this position. Optionally, one or more torsion springs could be integrated into the interface between the shoulder bolts 86 and the arm portions 78 to provide a small, continuous rotational biasing force that helps to maintain the actuating lever 64 in its stowed position.

Figure 8:
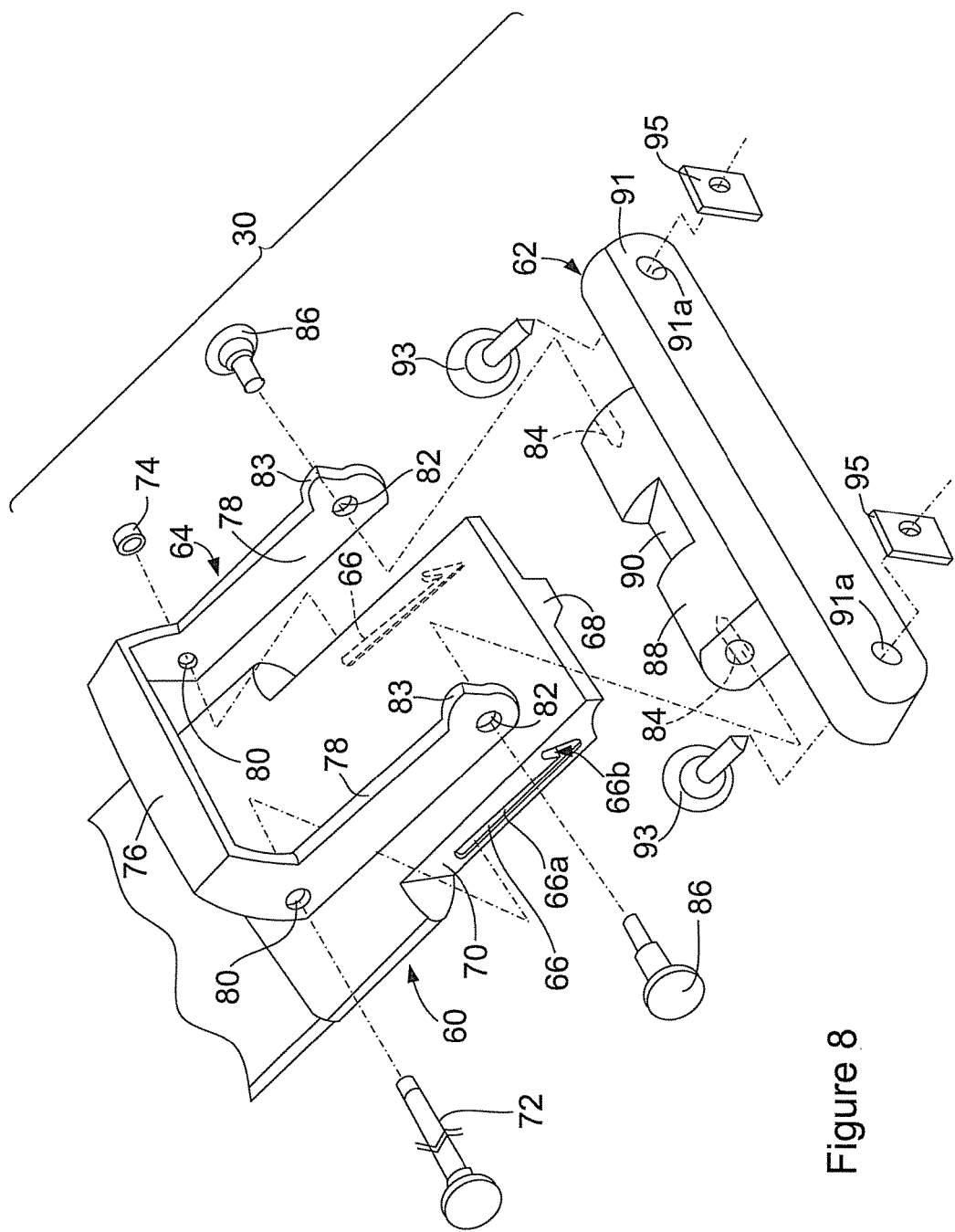
FIG. 8 is an exploded perspective view of the one end support of one of the two rear cross bars of the system.

Referring further to FIG. 8, base 62 includes a mounting portion 88 in which the threaded bores 84 are formed. The mounting portion 88 also includes a notched portion 90 which engages the projecting portion 68 on the housing 60 when the housing is rotated into its elevated position. The notched portion 90 effectively forms a stop surface which limits rotational movement of the housing 60 to a predetermined angular orientation. An attachment portion 91 is adapted to rest flush against an inside surface of the one of the support rails 12, provided no mounting track is being used, and holes 91a allow threaded fastening elements 93 to be secured directly to the inside vertical wall portion of the support rail 12. If a C-shaped track such as support track 28 is incorporated, then conventional tap plates 95 may be located inside the C-shaped track 28 and engaged using the threaded fastening elements 93. The use of the C-shaped track 28 allows quick longitudinal adjustable positioning of the end support 30 along the C-shaped track.

Figure 10:
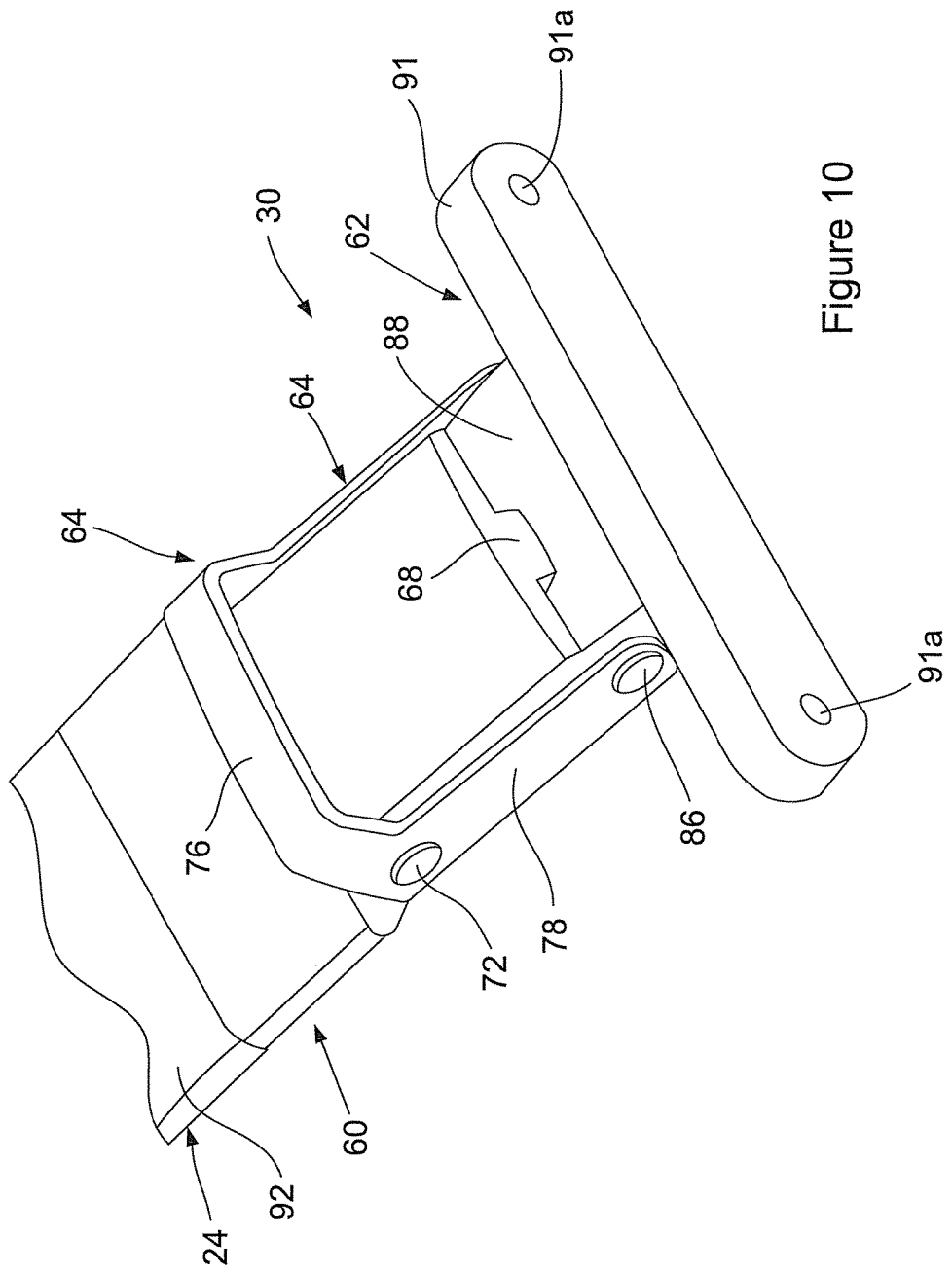
FIG. 10 is a perspective view of the end support of FIG. 8 with the end support in its stowed position.

FIG. 10 shows the cross bar, cross bar 24 in this example, in its stowed position. In the stowed position, the end support 30 is positioned generally flat or co-planar with a longitudinal axis of a cross bar member 92 of the cross bar 24. The allows the entire cross bar 24, with both of its end supports 30 included, to be positioned slightly below a height defined by upper surfaces of the support rails 12. This significantly helps to maintain the aerodynamic efficiently of the vehicle 14 when the cross bars 20-24 are not being used to support a load or article thereon.

Figure 11:
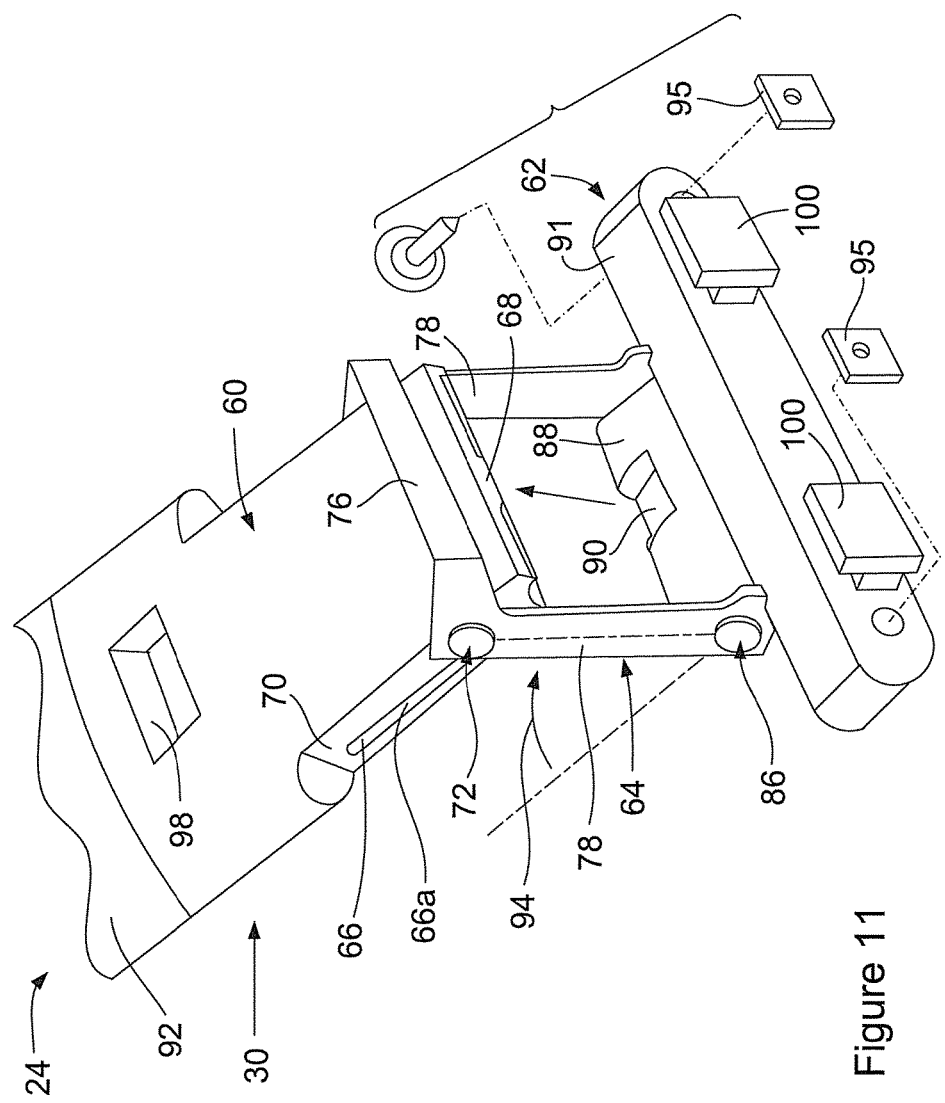
FIG. 11 is a perspective view of the end support of FIG. 10 but with the end support raised into its operative position.

FIG. 11 shows the cross bar 24 in its raised (i.e., operative) position. The user manipulates the cross bar 24 into this position by grasping the actuating lever 64 and pulling it in a rotational motion in accordance with arrow 94. During this rotational lifting motion, the slide pin 72 slides toward the base 62 until reaching the end of the linear portion 66a of the groove 66, and then moves into the V-shaped, upwardly turned section 66b of the groove 66. The weight of the cross bar 24 and the end support 30 itself help to maintain the end support in this position when the user releases the lever 64. In this position an upper surface of the cross bar member 92 is positioned above the upper surfaces of the support rails 12 and above the upper surfaces of the front air dam 18 and the rear spoiler portion 26. This enables larger articles or articles with a large footprint to be easily supported on the cross bars 20-24 without interference with the other components of the system 10.

FIG. 11 also illustrates the housing 60 having an optional tie down opening 98 to which a bungee cord or other form of article securing component may be secured. The base 62 is illustrated as having an optional pair of integrally formed T-shaped support feet 100. The T-shaped support feet 100 may engage within the C-shaped track 28 of one of the support rails 12 to assist in enabling smooth sliding movement of the base 62 along the C-shaped track 28 when the user is positioning the cross bar 24.

Figure 12:
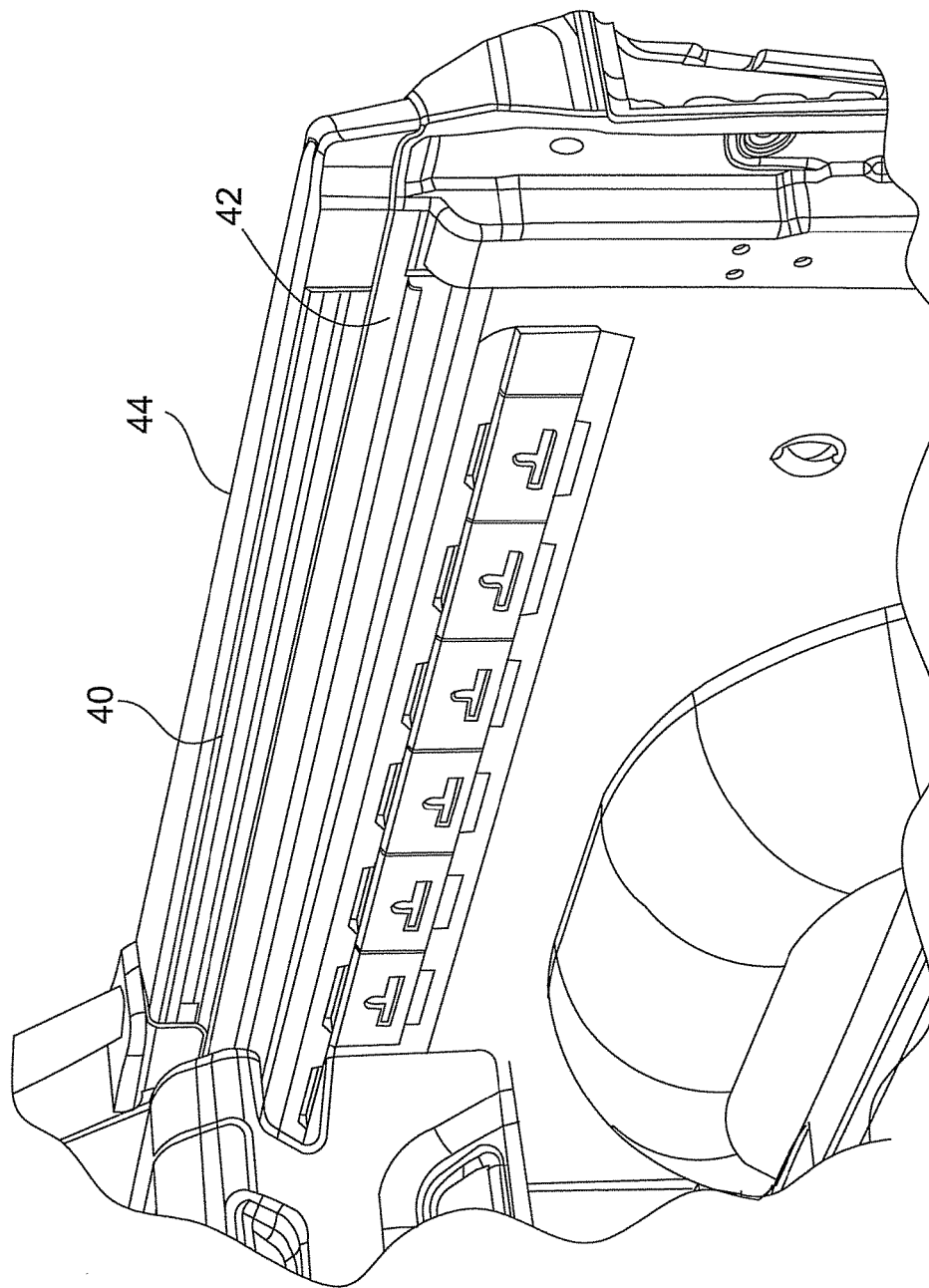
FIG. 12 is an enlarged perspective view of one of the tracks mounted in bed of the vehicle.
Figure 13:
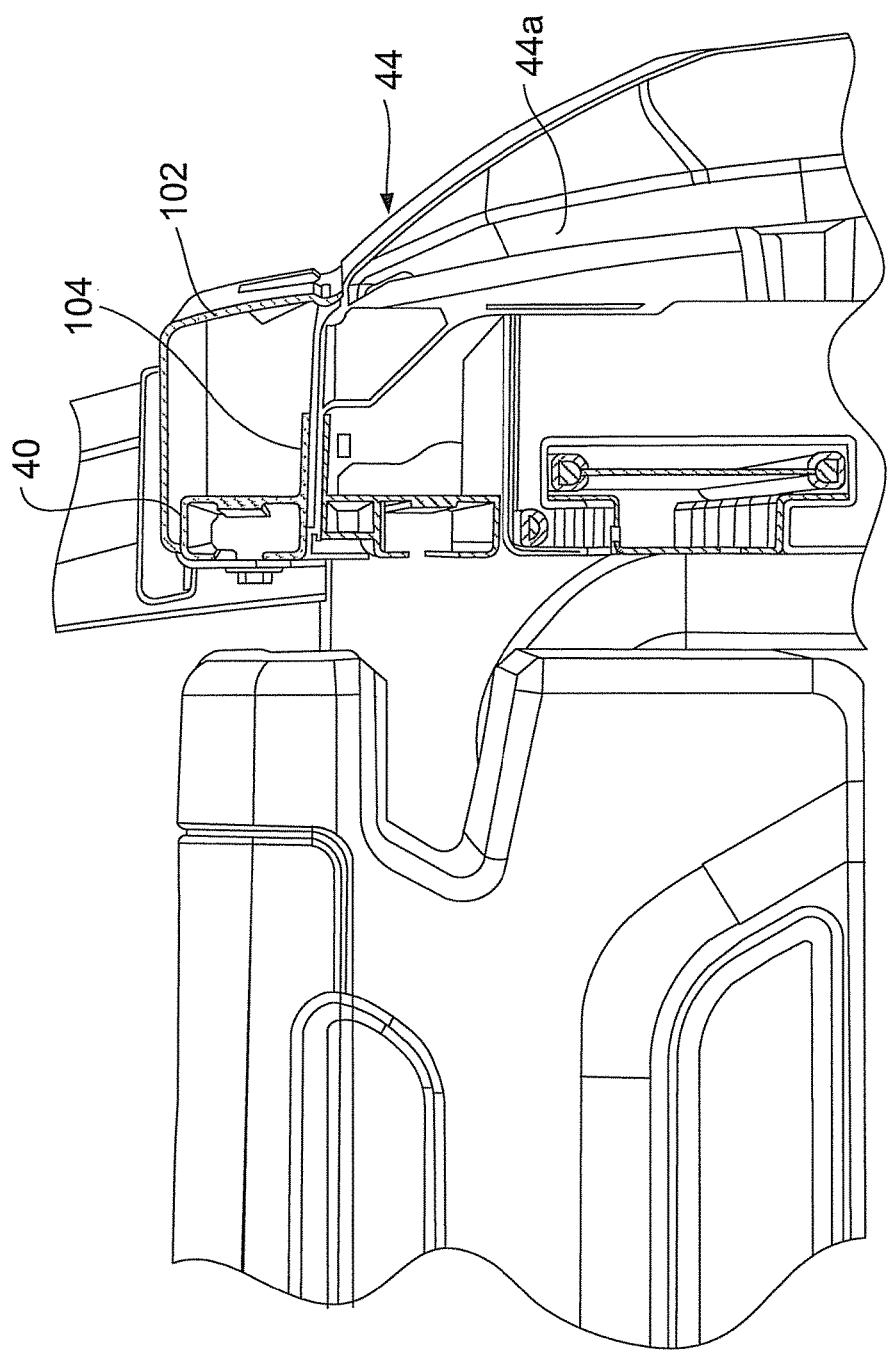
FIG. 13 is a cross sectional end view taken in accordance with section line 13-13 in FIG. 12.

FIGS. 12 and 13 show one of the bed mounted support tracks 40 in greater detail. The support track 40 in this example is integrated into a structurally robust tubular sidewall housing 102 and has a lip portion 104 that may be secured directly to the structural sheet metal 106 that helps to form a bed sidewall 44a of the bed 44. Securing may be by rivets, conventional RIVNUT® style fasteners, threaded fasteners, welding or brazing, etc.

Figure 14:
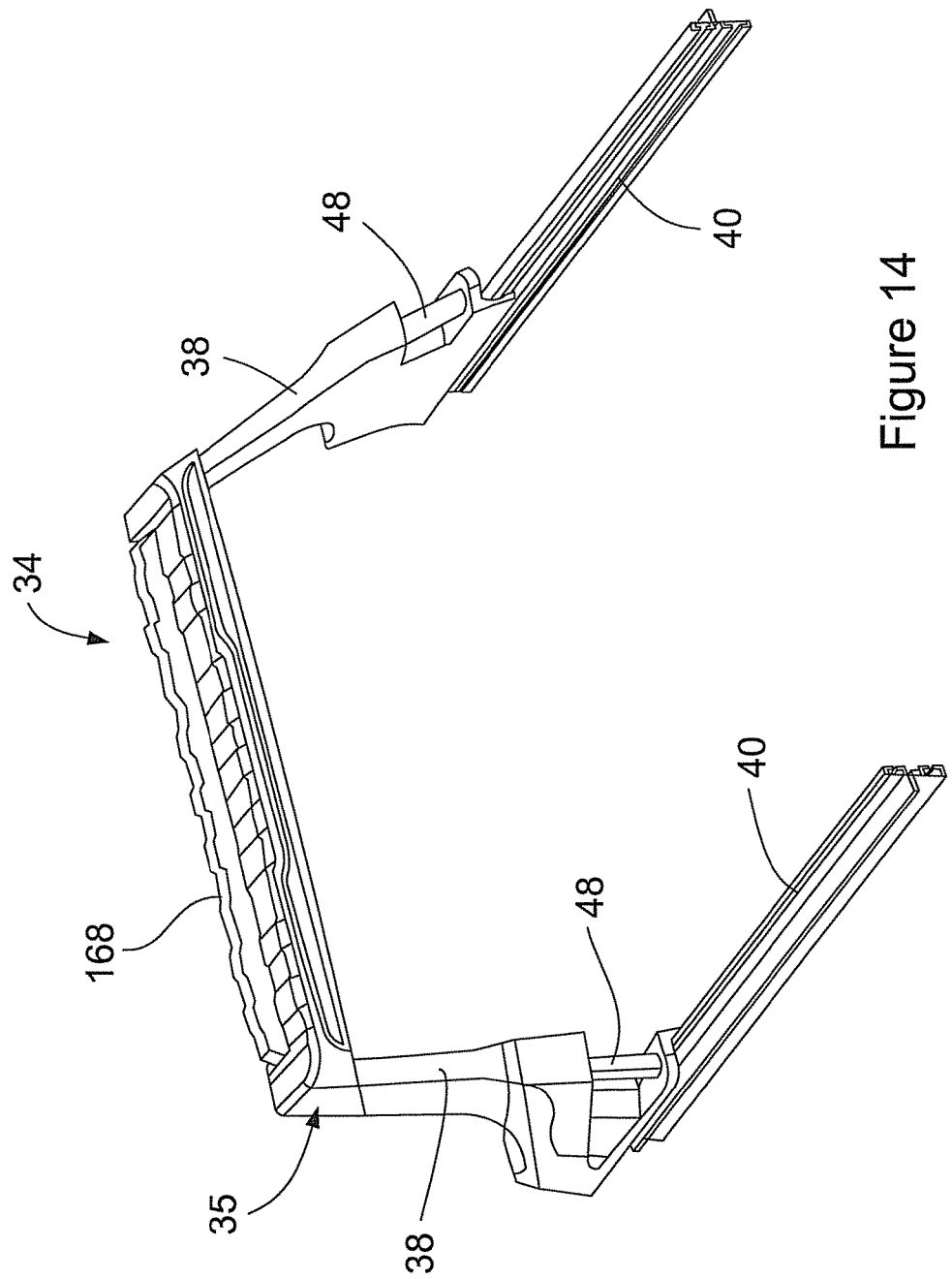
FIG. 14 is a perspective view of the rear spoiler/support mounted on its tracks.
Figure 15:
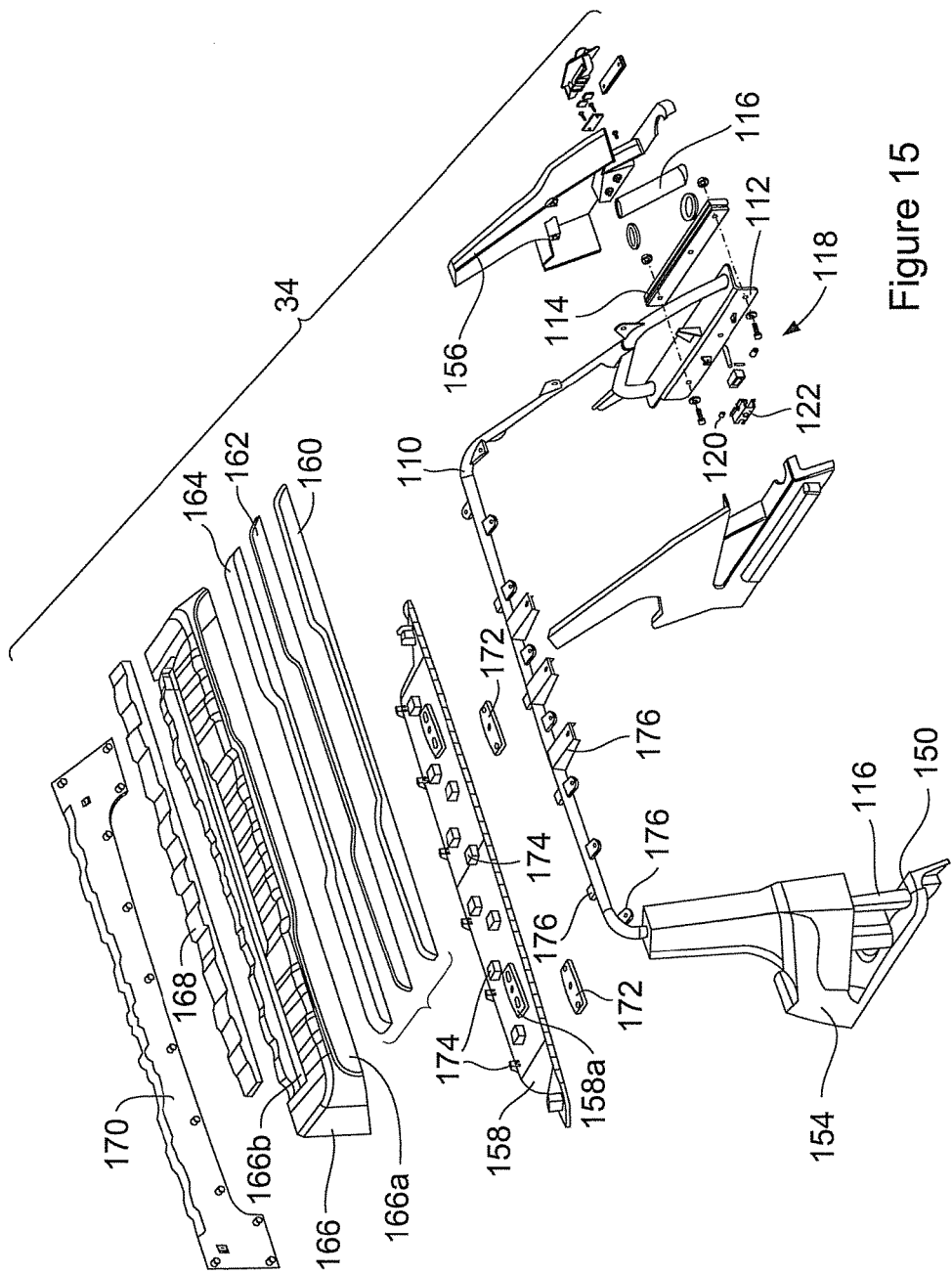
FIG. 15 is an exploded perspective view of various components making up the rear spoiler/support mechanism.

Referring to FIGS. 14 and 15, the subsystem 34 rear spoiler/support is shown in greater detail. With specific reference to FIG. 15, the subsystem 34 can be seen to include a tubular frame 110 having an L-shape support bracket 112. A short track portion 114 is fixedly secured to the L-shaped support bracket 112 by suitable fasteners, such as threaded fasteners. A rotatable tubular sleeve 116 is positioned over a lower portion 110a of the tubular frame and rotatable thereabout, which will be described in greater detail in the following paragraphs.

A latching mechanism 118, shown in enlarged fashion in FIG. 15a, which will be discussed in greater detail in the following paragraphs, can be seen to include a latch cable 120, a latch bracket 122, a latch slider 124, a dowel pin 126, a latch pin 128 and a spring 130. With reference to FIGS. 16a, 16b, 18a and 18b, the construction of the latching mechanism 118 can be seen in further detail. In FIG. 16a the latch bracket 122 can be seen to house the latch slider 124 for sliding longitudinal motion. The dowel pin 126 extends through a bore 132 in the latch pin 128 and through slots 134 in the latch slider 124 (FIGS. 16c and 16d). The slots 134 are arranged at an angle (i.e., non-parallel) to the direction of sliding movement of the latch slider 124. Optionally, a portion of the dowel pin 126 may be threaded and the bore 132 in the latch pin may also be threaded, to thus prevent the dowel pin from becoming dislodged from the latch pin 128 and the latch slider 124.

Figure 16A:
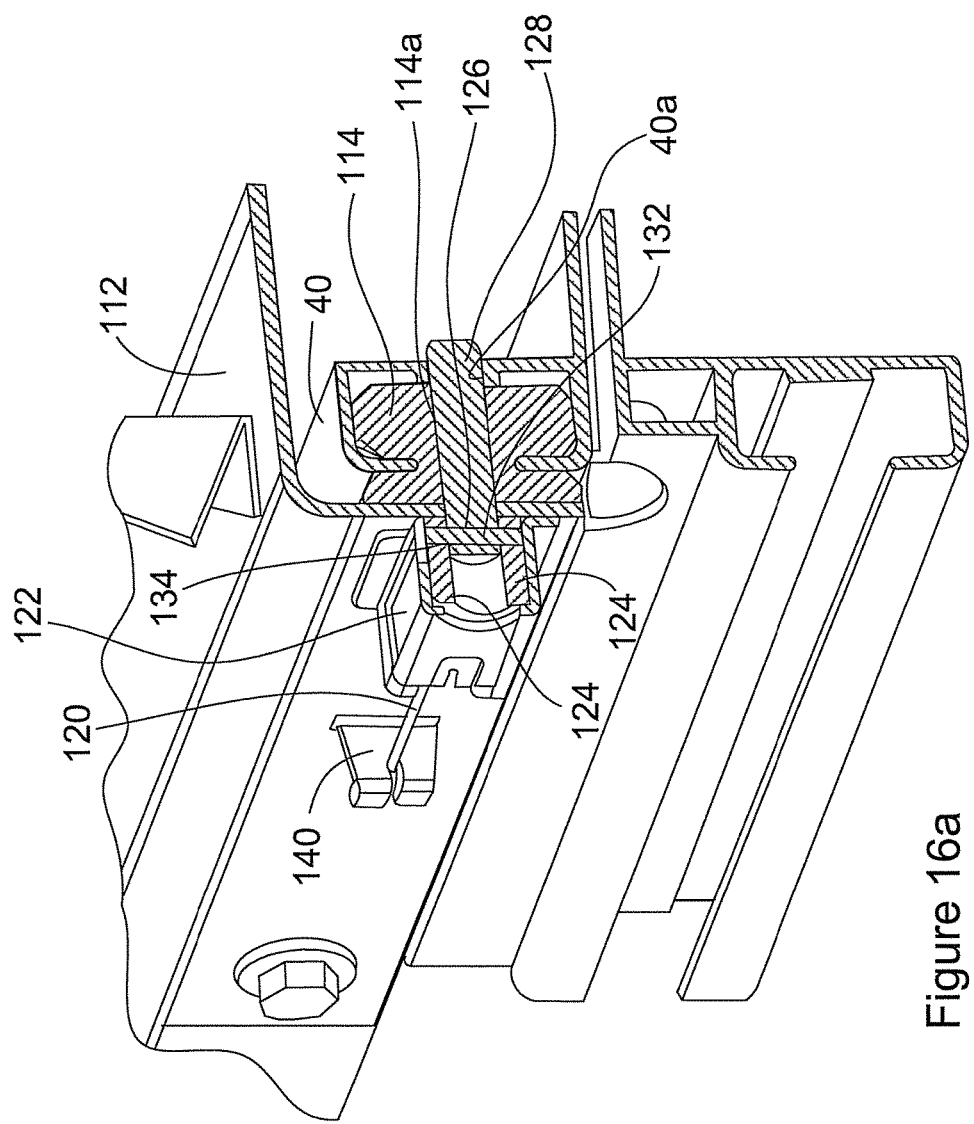
FIG. 16a is a perspective view of one of the latching mechanisms of the rear spoiler/support mechanism in a latched orientation relative to its respective track.
Figure 16B:
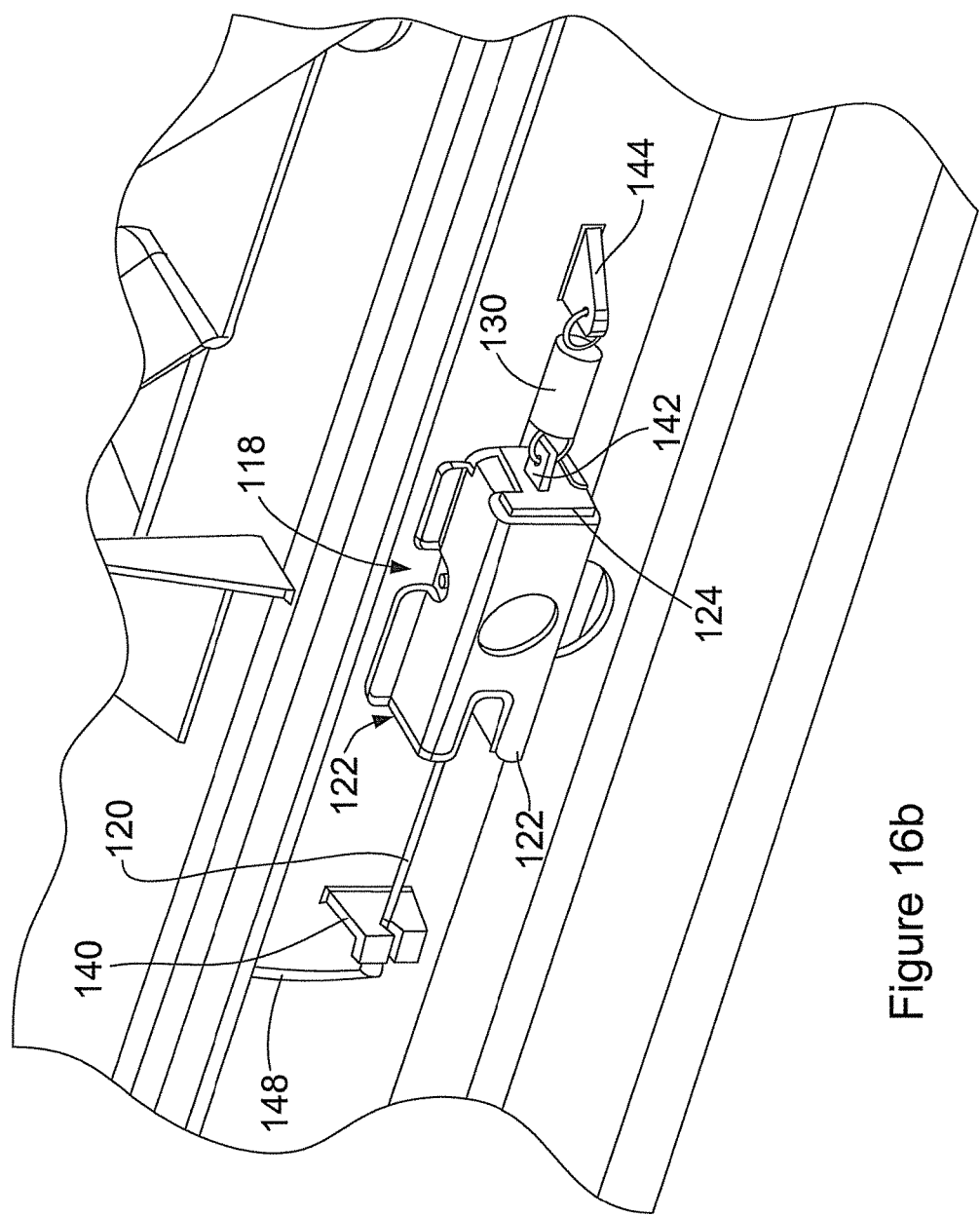
FIG. 16b is a slightly different perspective view of the latching mechanism shown in FIG. 16a, with the latching mechanism being in the latched orientation.
Figure 17A:
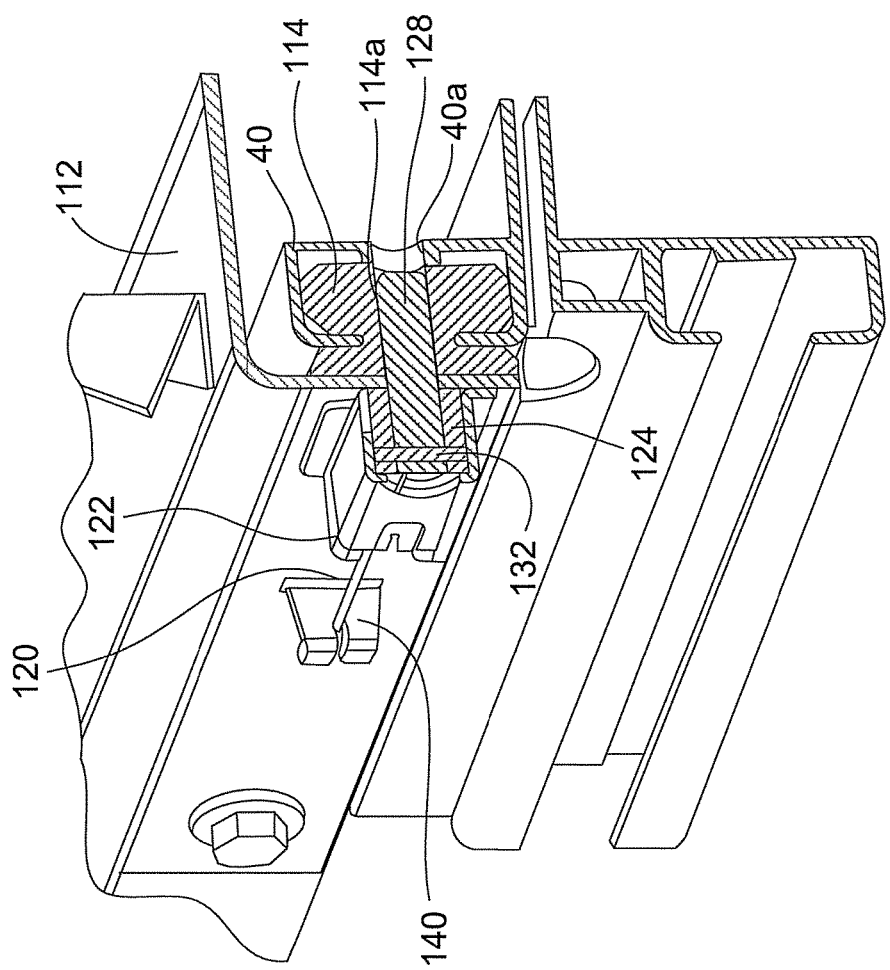
FIG. 17a is a perspective view of the latching mechanism of FIG. 16a but with the mechanism in an unlatched orientation relative to its respective track.
Figure 17B:
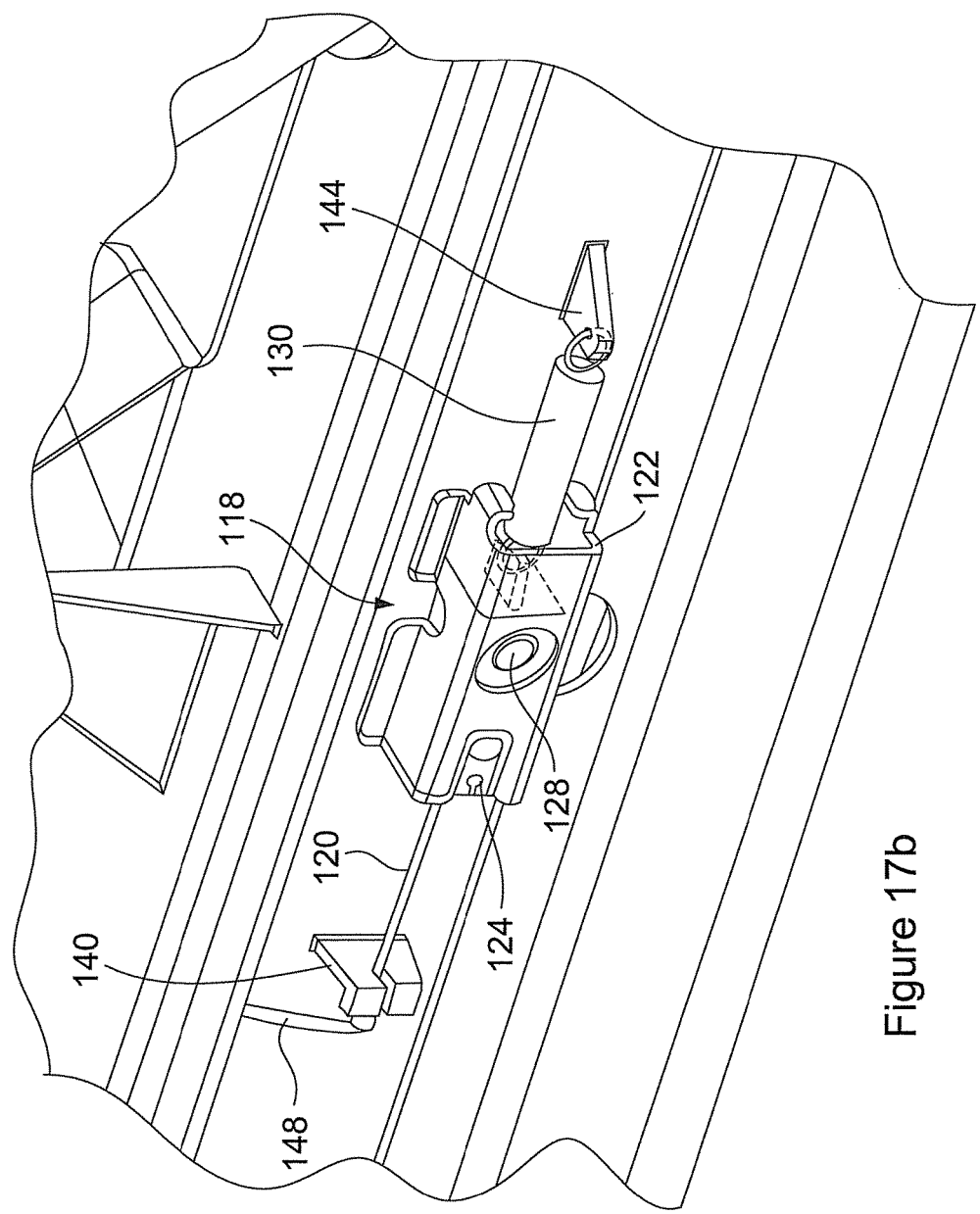
FIG. 17b is a slightly different perspective view of the latching mechanism of FIG. 17a, also showing the latching mechanism in a latched orientation relative to its respective track.

With further reference to FIGS. 16a and 16b, the latch pin 128 also extends through a bore 114a in the track portion 114, and then through one of a plurality of spaced apart bores 40a in track 40. The track portion 114 is constructed to engage the track 40 so that it retained in the track, but still movable smoothly longitudinally along the track 40. The latch pin 128 is also positioned within a hollowed out section 136 of the latch slider 124. The cable 120 is physically secured at one end within an opening 138 (FIG. 18a) in the latch slider 124, and at its opposite end it is held by a projecting cable stop 140 (FIGS. 16a and 16b). At an opposite side of the latch slider 124 a projecting tab 142 allows the spring 130 to be secured to the latch slider 124. An opposite end of the spring is secured to another projecting tab 144. The latch bracket 122 and the latch slider 124 are further positioned elevationally in line with the spaced apart bores 40a in the track 40 (FIGS. 16b and 17b) so that the latch pin 128 may engage within any one of the spaced apart bores 40a when it is longitudinally aligned therewith. In this example the latching mechanism 118 at each side of the subsystem 34 is identical in construction, although the latching mechanisms 118 need not be perfectly identical.

Figure 15A:
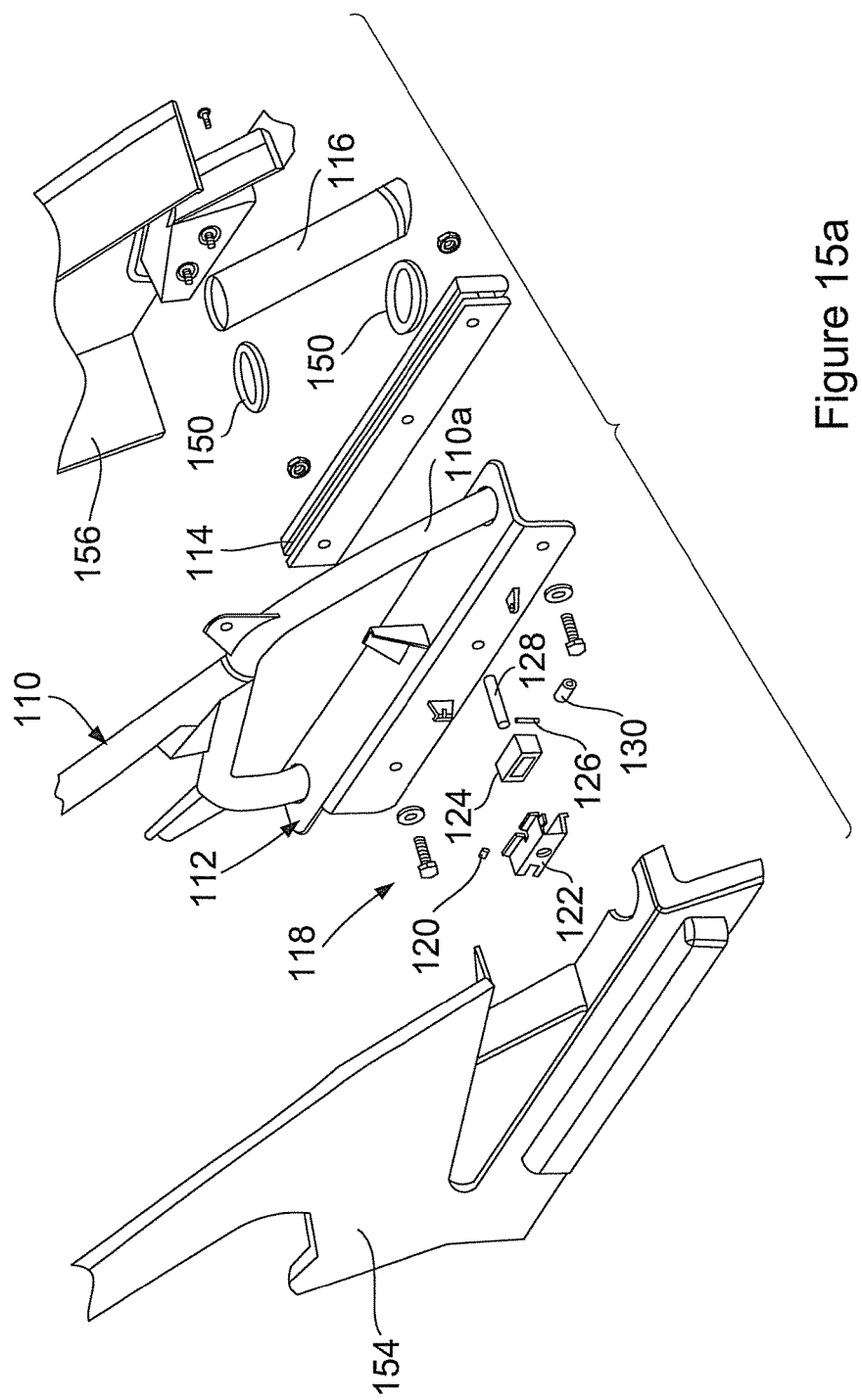
FIG. 15a is an enlarged view of a portion of the components shown in FIG. 15.
Figure 16D:
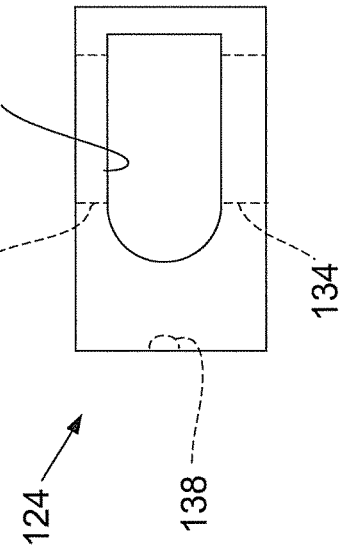
FIGS. 16c and 16d show opposite side views of the latch slider 124.
Figure 16C:
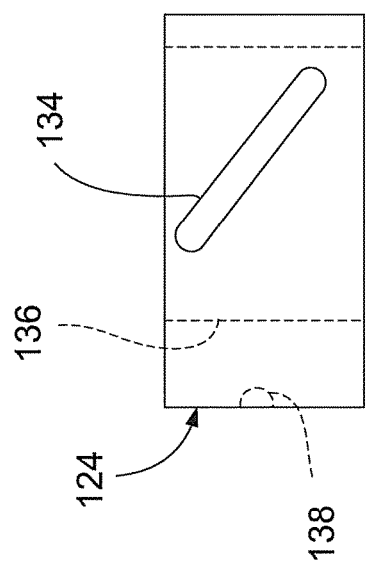

With further reference to FIGS. 15a and 16b, a length of cable 148 is secured to the locking mechanism at one side of the subsystem 34 and is routed within the tubular frame 110 (FIG. 15) and to the rotatable tubular sleeve 116 at the opposite side of the subsystem 34. The rotatable tubular sleeve 116 may be mounted on bushings 150 to assist in enabling smooth rotational movement, similar to the feel of a traditional motorcycle throttle mechanism. The end of the length of cable 148 may be wound onto a groove 152 or groove-like component so that when the tubular sleeve is grasped with one hand and rotated, this draws the length of cable 148 such that a portion thereof is wound onto the groove 152. One or more guide rollers may be incorporated within or adjacent the tubular frame 110 to help provide smooth takeup and release of the length of cable 148 as the tubular sleeve 116 is rotated.

To release the latching mechanism 118 so that it may be slide along the tracks 40, the user grasps the rotatable tubular sleeve 116 with one hand and rotates it in one rotational direction. This causes a portion of the length of cable 148 to be taken up and wound onto the rotatable tubular sleeve 116 thereon, and simultaneously pulls the cable 120, thus moving the latch slider 124 to the left in the drawings of FIGS. 16b and 17b. The rotatable tubular sleeve 116 also is directly secured via another short length of cable (not shown) to the cable 120 at its side of the subsystem 34. Thus, this rotational movement of the rotatable tubular sleeve 116 has the effect of pulling the cable 120 on both of the latching mechanisms 118 simultaneously. At both latching mechanisms 118, the latch slider 124 will simultaneously be pulled from the position shown in FIG. 16b to the position shown in FIG. 17b. During this sliding movement of the latch slider 124, the dowel pin 126 is caused to be urged in a direction perpendicular to movement of the latch slider 124 because of the engagement of its opposite ends with the slots 134 in the latch slider 124. Thus, as the latch slider 124 moves to the left in FIGS. 16b and 17b, the dowel pin 126 pulls the latch pin 128 out from engagement with the bore 40a in track 40. At this point the latch pin 128 from both of the latching mechanisms 118 will be retracted from their respective bores 40a in track 40, and the entire subsystem 34 will be free to slide along the tracks 40 while the user maintains the rotatable tubular sleeve 116 in its rotated orientation. The subsystem 34 can then be aligned with a new pair of the bores 40a, for example near the tailgate of the vehicle, and when the rotatable tubular sleeve 116 is released, the biasing force provided by the spring 130 at each latching mechanism 118 immediately pulls the latch slider 124 back to the right into the position shown in FIG. 16b. This action causes the dowel pin 126 to urge the latch pin 128 back into engagement with one of the aligned bores 40a in the track 40. It will be appreciated that if the latch pins 128 are not aligned with a pair of the bores 40a, it may be necessary for the user to move the subsystem 34 slightly towards or away from the tailgate of the vehicle 14 to line up the latch pins 128 with a pair of the bores 40a. If necessary, the entire subsystem 34 can be slid out from the tracks 40 and removed entirely from the vehicle 14.

With further reference to FIG. 15, the latching mechanism 118 components may be substantially enclosed within panel portions 154 and 156. The rotatable tubular sleeves 116 each remain exposed. And as should be appreciated from the above discussion, that while FIG. 15 only illustrates one of the latching mechanisms 118, each side wall portion 38 of the subsystem 34 incorporates the latching mechanism.

FIG. 15 also illustrates a plurality of components that are used to help construct a spoiler/support portion 35 of the subsystem 34. These include a crossbar lower panel 158, a crossbar light bezel 160, a crossbar colored light lens 162 (for example a red tinted lens), and a crossbar light housing 164. Components 10-164 may be secured together to form a single assembly which is mounted to a crossbar upper panel 166 within recess 166a thereof. A pivotally mounted crossbar riser 168 may be supported for pivoting and linear movement within a mounting recess 166b of the crossbar riser 168. A crossbar panel closeout 170 may be secured to the crossbar upper panel 166 for close off a rear area of the crossbar upper panel 166. LED courtesy light assemblies 172 may also be mounted in recesses 158a of the crossbar lower panel 158. Threaded fasteners (not shown) may be used to connect the crossbar lower panel 158 via threaded boss portions 174 to mounting flanges 176 on the tubular frame 110.

Figure 18A:
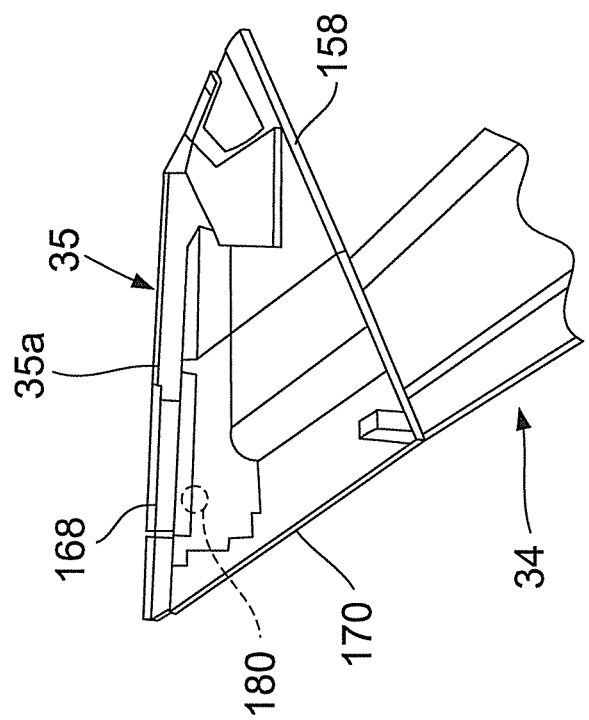
FIG. 18a is a side elevational view of a portion of the rear spoiler/support subsystem showing the crossbar riser in its retracted or stowed position.
Figure 18B:
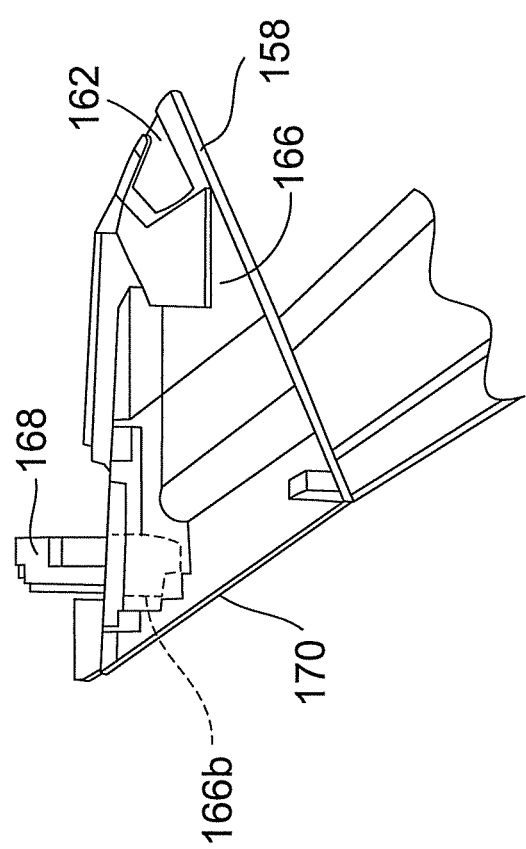
FIG. 18b shows the crossbar riser of FIG. 18a in its raised or deployed position.

The fully assembled spoiler/support portion 35 is shown in FIGS. 18a and 18b. FIG. 18a shows the crossbar riser 168 in its retracted or stowed position. In this position the spoiler/support 35 rests level with an upper surface 35a of the spoiler/support portion 35 which provides a smooth, aerodynamic profile. When the crossbar riser 168 is pivoted into its raised position, it drops down slightly into the recess 166b and is supported such that its upper edge as approximately level with the upper surfaces of the cross bars 20-24 when the cross bars are in their elevated positions. To accomplish this the crossbar riser 168 may be mounted on a pivot pin 180 that is captured within an internal track (not visible) formed within the recess 166*b*, which allows the crossbar riser 168 to be lowered a small distance once it is pivoted up into a vertical position. Once in the position shown in FIG. 18*b*, wherein the crossbar riser 168 is fully seated in the recess 166*b*, the crossbar riser 168 is not able to simply pivot back into its retracted position (FIG. 18*a*) without first being manually lifted a short distance before pivoting it into its horizontal position. This feature ensures that the crossbar riser 168 will not simply "flip" (i.e. rotate) back down into its retracted position if the vehicle should hit a bump or pothole in a road surface while the vehicle is moving. Still further, one or more openings may be formed in the crossbar riser 168 to enable other article securing implements, brackets or bungee cords to be attached to the crossbar riser.

Figure 15B:
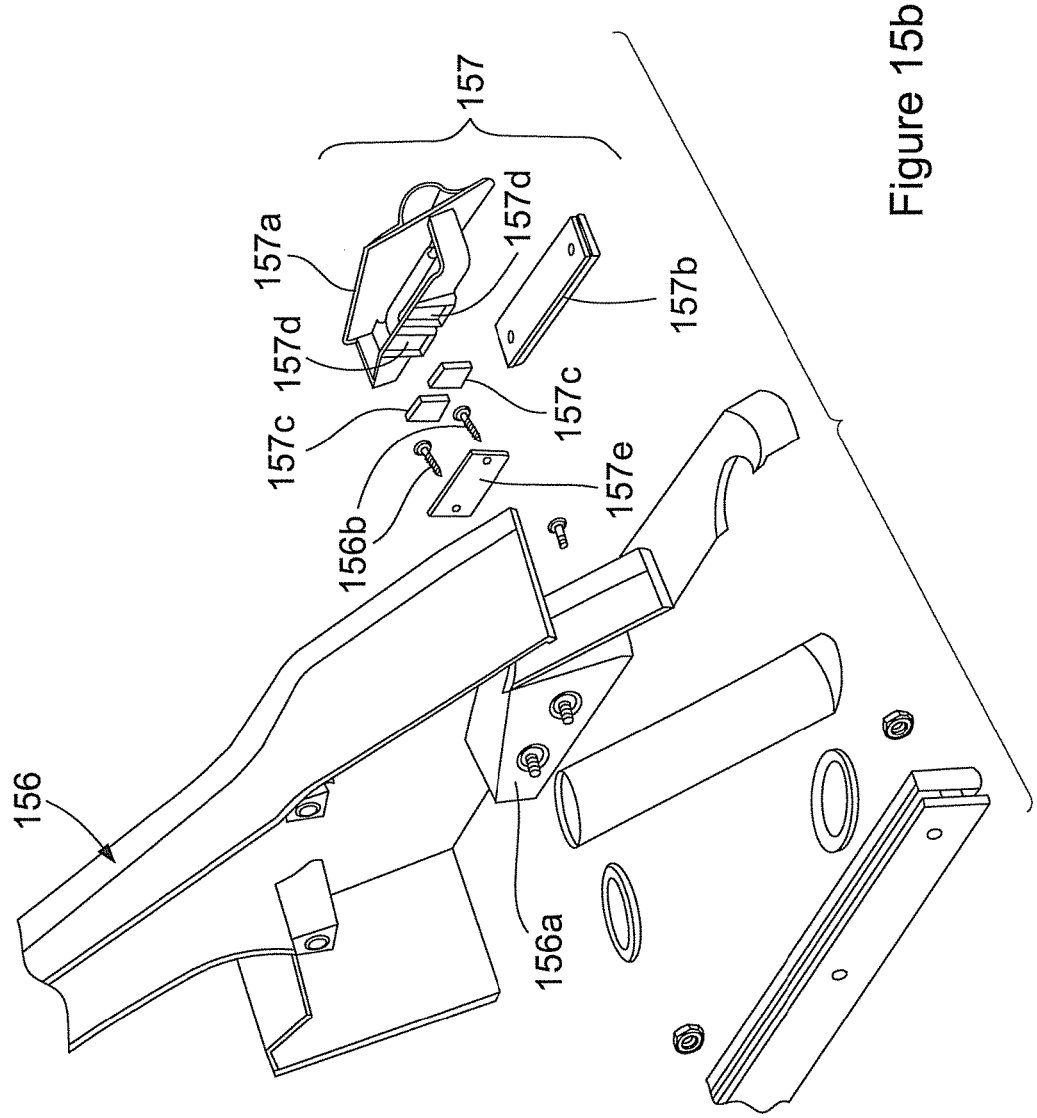
FIG. 15b is an exploded view of the components of a removable light assembly that may be removably secured via magnets in a recess of the panel portion.

Referring briefly to FIG. 15*b*, an enlarged portion of a removably light assembly 157 is shown which may be stowed in a pocket 156*a* formed in the panel portion 156. Each of the panel portions 156 of FIG. 15 may incorporate the removable light assembly 157 if desired. The removable light assembly 157 includes a housing 157*a* to which an LED light bar 157*b* may be secured via a suitable plurality of threaded fasteners (not shown). The housing 157*a* includes a pair of magnets 157*c* that are secured in recesses 157*d* of the housing 157*a* such as by adhesives or threaded fasteners. A metallic plate 157*e* may be secured in the pocket 156*a* via threaded fasteners 156*b*. The assembled removable light assembly 157 may then be releasably secured using the magnets 157*c* to the metallic plate 157*e*, when not needed. When the removable light assembly 157 is needed for use, such as to assist a user in providing illuminating to a tire when changing a flat tire at night time, the removable light assembly 157 may simply be pulled off of the metallic plate 157*e* and placed against a body panel of the vehicle near where the illumination is needed. The removable light assembly 157 may thus be temporarily secured to a body panel of the vehicle or to any other magnetic surface to provide a small degree of illumination. In this regard it will be appreciated that the housing 157*a* may also include a built in battery, for example a rechargeable lithium ion battery, and an On/Off switch (not shown). A suitable charging port may also be included on the housing (e.g., +12 volt or USB port) to enable periodically re-charging the removable light assembly 157.

Figure 19:
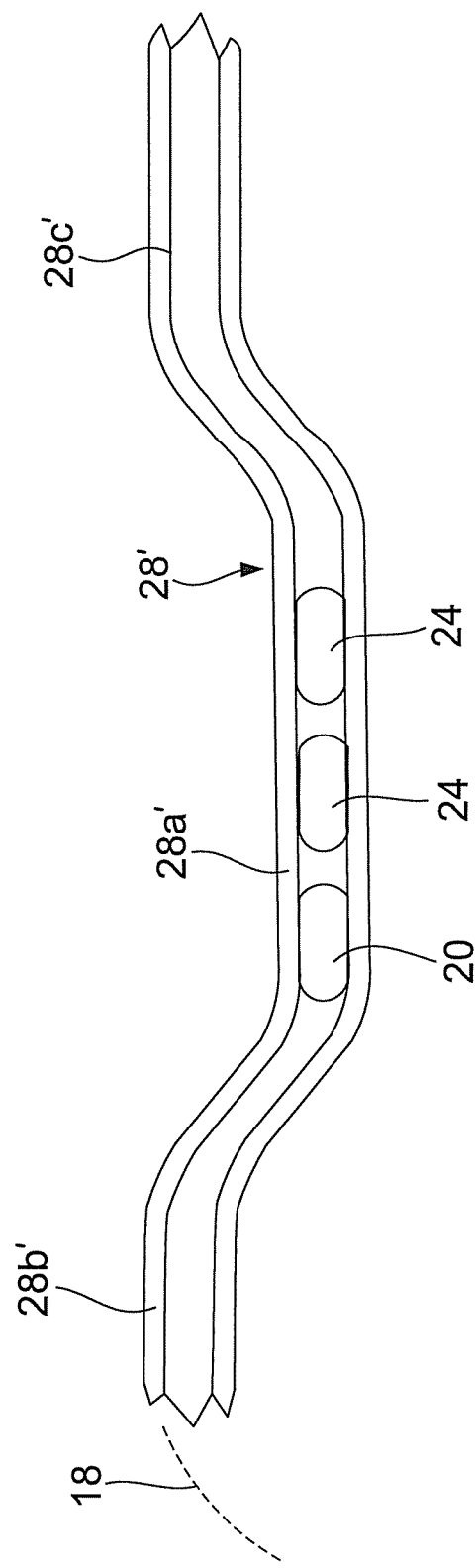
FIG. 19 is side view of an alternative track which allows the cross bars to be moved slidably into an intermediate, elevationally lower portion of the track, which is well below the front air dam 18, and thus positions the cross bars out of the airflow path over the vehicle cab.

Referring to FIG. 19, a portion of an alternative support track 28' is shown. The support track 28' may extend substantially the full longitudinal length of the outer body surface 16 of the cab of the vehicle 14, and in this example forms a single, continuous length of track. Of course, two or more separate sections of track could alternatively be secured together adjacent one another to effectively form one continuous length of track. The track 28' forms a C-shaped cross section when viewed from one end, and has a lowered intermediate section 28*a'* positioned between elevated forward and rearward sections 28*b'* and 28*c'*. The lowered intermediate portion 28*a'* sits slightly below an upper surface of the front air dam 18. Cross bars 20-24 are each shown in highly simplified end views to illustrate that, when positioned in the lowered intermediate section 28*a'*, which represents a stowed position, the cross bars 20-24 will be positioned below the upper surface of the front air dam 18. As such, they will not be positioned in the air flow stream passing over the cab of the vehicle 14. The continuous length of the track 28' enables the user to simply loosen each of the threaded fastening elements 93 (FIG. 8) and then slide the cross bars 20-24 into the lowered intermediate section 28*a'*, and then to re-tighten the threaded fastening elements 93. In this embodiment it is preferred that the base 62 incorporate the T-shaped support feet 100 shown in FIG. 100 to allow for smooth, easy sliding movement of the end support 30 along each of the two tracks 28'.

It will also be appreciated that while tracks 28 have been illustrated as forming part of the system 10, the tracks could be completely eliminated and the inwardly facing surfaces of the support rails 12 could be provided with attachment portions, for example metal brackets with tapped holes, to which the end supports 30 may be directly attached. However, with this embodiment, the end supports 30 would not be longitudinally adjustable. Such an embodiment may still be preferred to save slightly on costs or weight.

Figure 24:
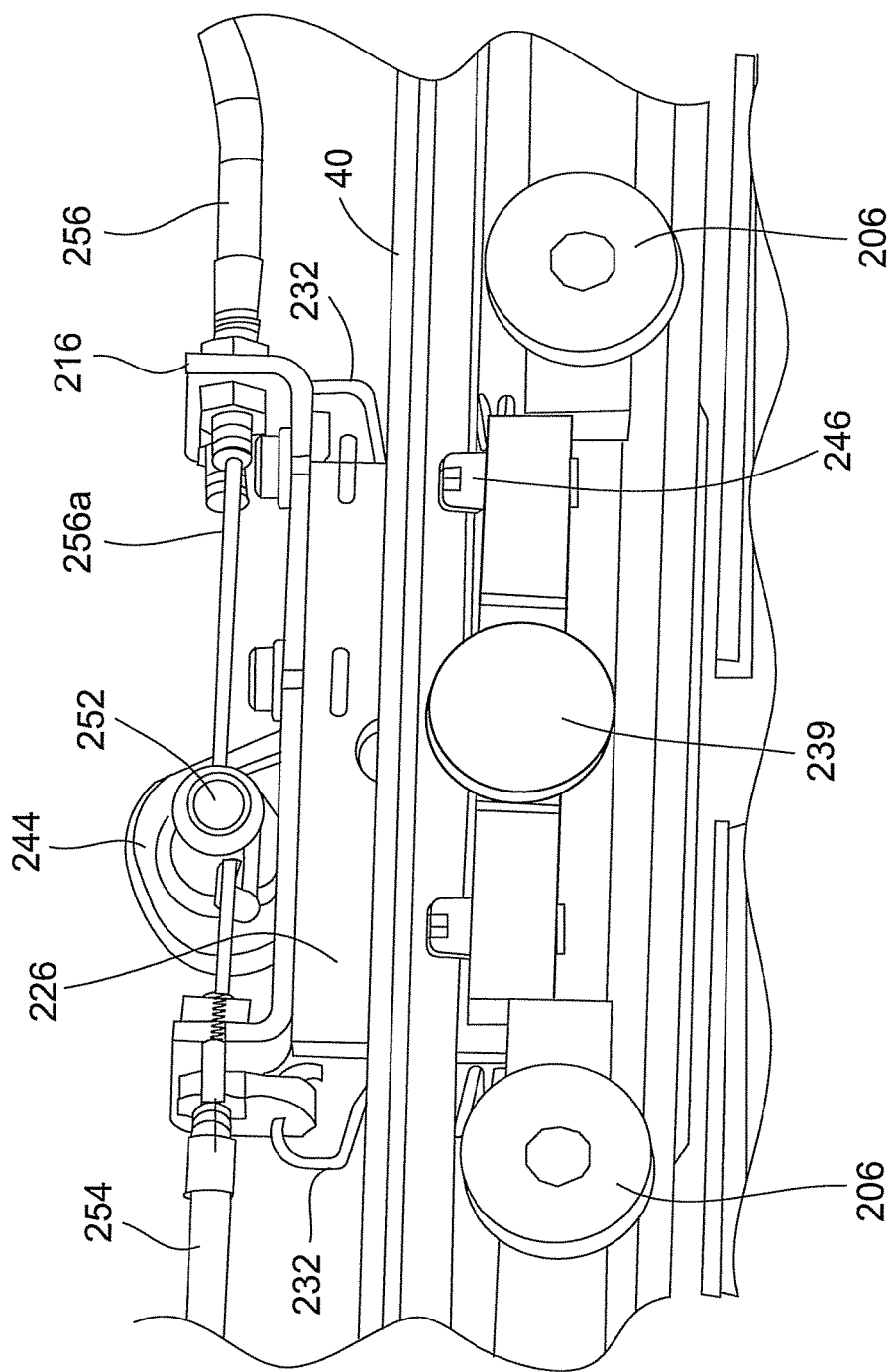
FIG. 24 is an inboard, side perspective view of the latching mechanism of FIG. 23.
Figure 25:
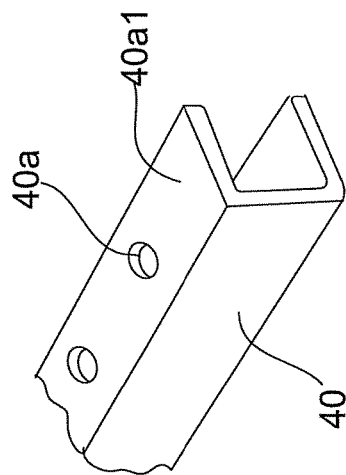
FIG. 25 is a perspective view of a portion of the support track showing the holes in an upper horizontal wall portion of the support track in which the pin-like elements of the latching mechanism can engage to lock the spoiler/support subsystem at a desired location along the support track.
Figure 26:
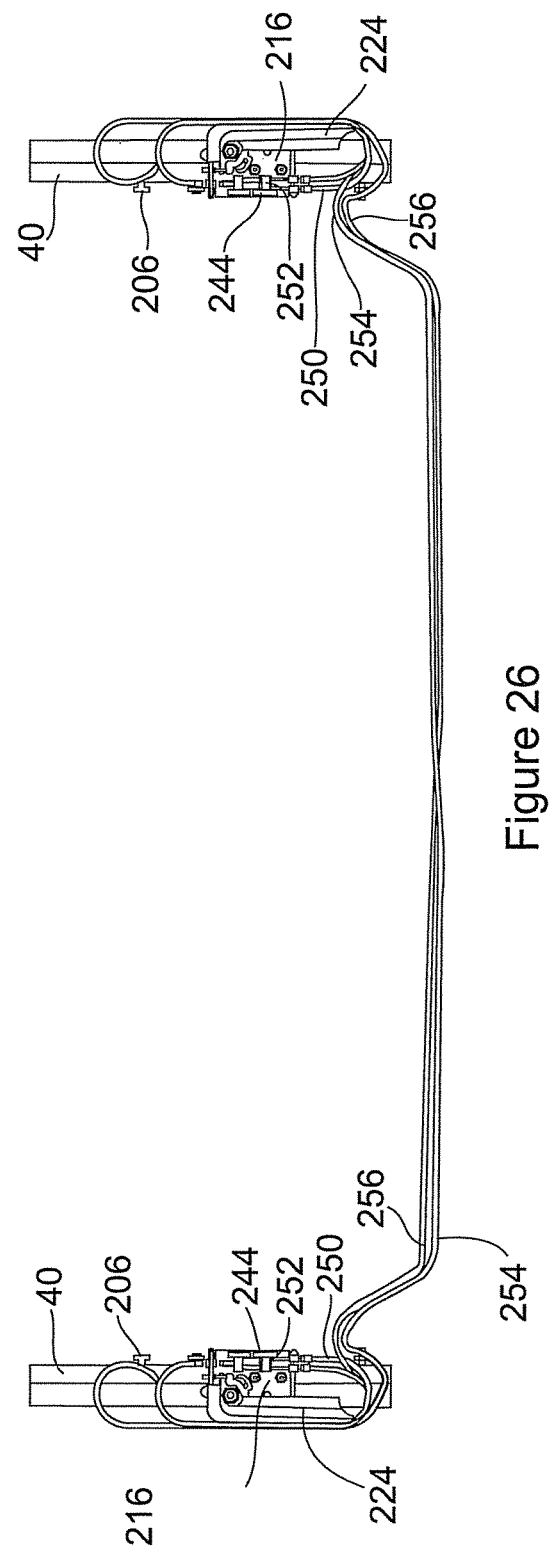
FIG. 26 is a high level diagram illustrating the intercoupling of the cables of the latching mechanisms which enables a "single side release" feature to be achieved by which both latching mechanisms can be simultaneously locked and unlocked from either locking system.

Referring now to FIGS. 20-26, a latching mechanism 200 in accordance with another embodiment of the present disclosure is shown. Latching mechanism 200 replaces latching mechanism 118 and the grab rail portions 48 to enable a user to position and secure the spoiler/support system 34 at a plurality of desired positions along the support tracks 40. It will be appreciated immediately that a pair of the latching mechanism 200 is used in connection with the subsystem 34 to enable adjustable positioning of the subsystem 34 along the tracks 40, with one disposed in each track 40. The latching mechanism 200 that is shown in FIGS. 24-26, and which will be described in the following paragraphs, is thus identical to the latching mechanism that is employed on the other support track 40.

Figure 22:
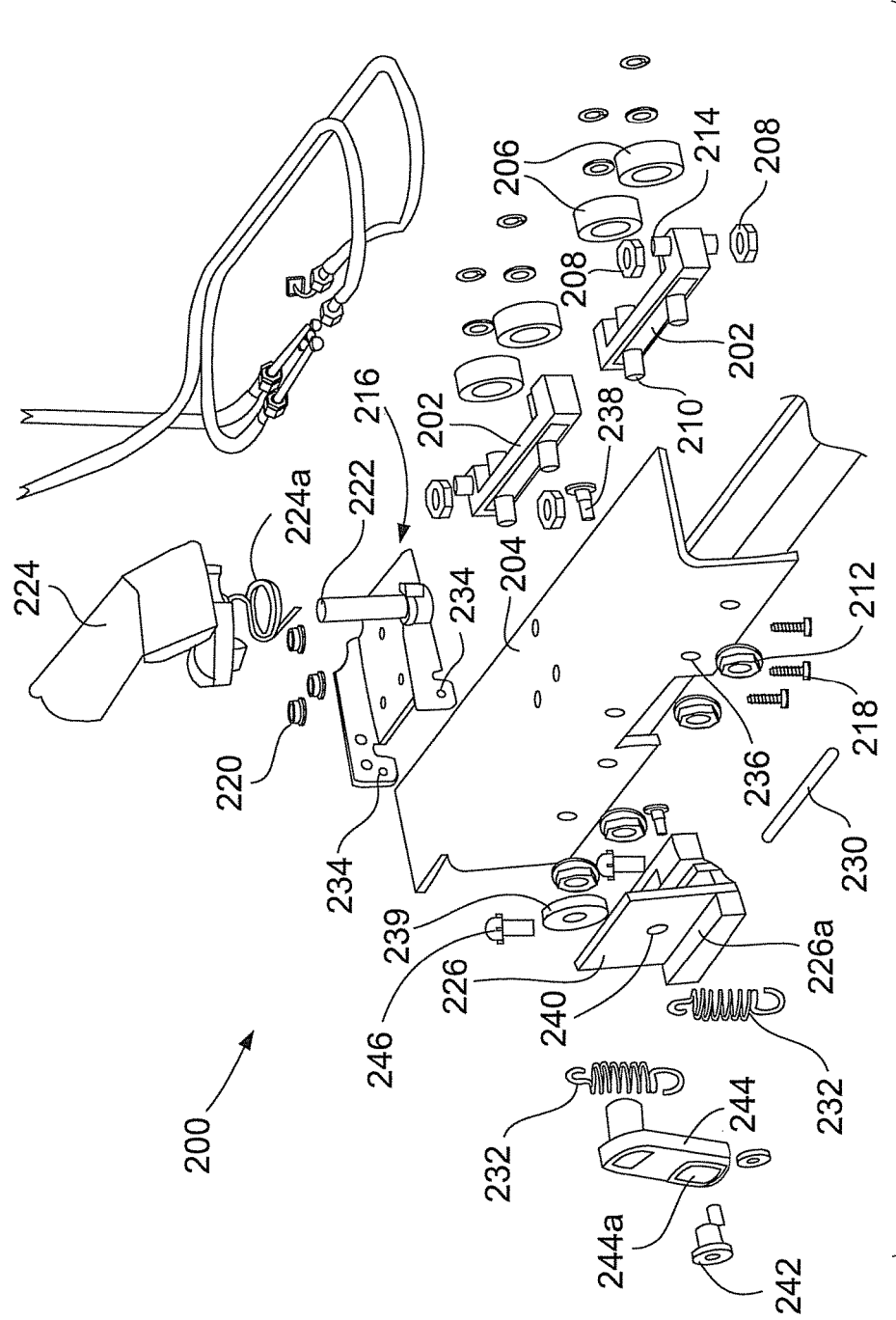
FIG. 22 is an exploded perspective view of the latching mechanism better showing all of the component parts thereof.
Figure 23:
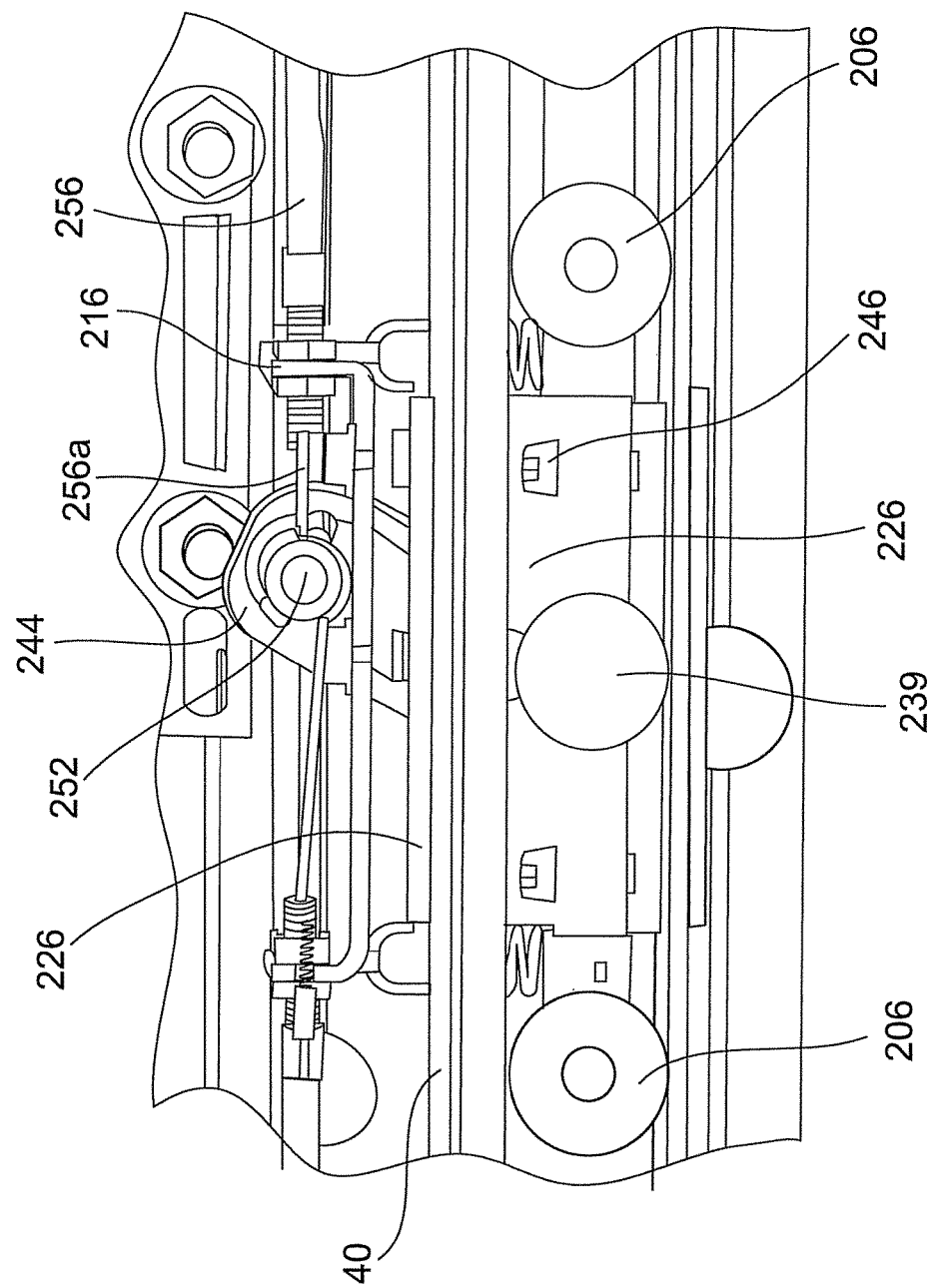
FIG. 23 is an outboard, side perspective view of the latching mechanism of FIG. 20 in its unlocked position.

Referring specifically to FIG. 22, the latching mechanism 200 includes a pair of carriage bars 202 which are secured to an L-shaped member 204. The carriage bars 202 each carry a plurality of vertically arranged wheels 206 and a pair of horizontally arranged wheels 208. The carriage bars 202 and the vertically oriented wheels 206 are secured to the L-shaped member 204 via conventional threaded bolts 210 and nuts 212. The horizontally oriented wheels 208 may be pressed on to rotatable axle-like members 214 or otherwise secured in conventional fashion by a threaded bolt and nut. A bracket 216 is also secured to the L-shaped member 204 via a plurality of threaded screws 218 and nuts 220. The bracket 216 includes a fixedly mounted stud 222 on which a pivotally movable lever 224 is mounted. A torsion spring 224*a* is disposed between the lever 224 and the bracket 216 and engages portions of the lever 224 and the bracket 226 to provide a constant biasing force to bias the lever 224 clockwise in the drawing of FIG. 22.

Also mounted to the L-shaped member 204 is a vertically movable element 226. The vertically movable element 226 includes a bore 228 through which a pin 230 is inserted. A pair of springs 232 engage opposite ends of the pin 230. The opposite ends of the springs 232 engage in holes in flanges 234 of the bracket 216 to bias the movable element 226 in an upward direction. The movable element 226 is disposed in a cutout 236 of the L-shaped member 204 and thus is able to move up and down relative to the L-shaped member 204. The movable element 226 is secured to the L-shaped member 204 via a threaded bolt 238 which extends through a guide wheel 239, through a vertically oriented slot 240 in the movable component 226, and is secured via nut 242. A camming element 244 is also pivotally secured to the movable element 226. The camming element 244 has a lower portion 244*a* which is positioned to ride over a ledge 226*a* of the movable component 226 as the camming element 244 is pivoted. Thus, movement of the camming element 244 is able to urge the movable element 226 linearly downwardly in the drawings of FIGS. 20-22, while springs 232 provide a constant biasing force which wants to urge the movable element 226 upwardly. With brief reference to FIG. 20, a flat spot 244b on the camming element 244 allows the camming element to hold the movable element 226 in the lowered position.

With further reference to FIG. 22, the movable element 226 also has attached to it two threaded pin-like elements 246 which are either threadably attached or otherwise attached in any conventional fashion to the movable element 226. The pin-like elements 246 act as locking pins to engage holes 40a formed in the support tracks 40, as indicated in FIG. 26. In this regard it will be appreciated that when the latching mechanism 200 is used, the C-shaped support tracks 40 will include a plurality of the holes 40a longitudinally spaced along each support track 40. The pin-like elements 246 will engage with a pair of the holes 40a in the horizontal wall portion 40a1 of the track 40 when the lever 224 is moved into its locked position. In the unlocked position, the pin-like elements 246 are withdrawn from the holes 40a. Collectively, the movable element 226, the camming element 244 and the pin-like elements 246 may be viewed as latching subsystems that are moved between latched and unlatched positions by movement of their associated lever.

Figure 20:
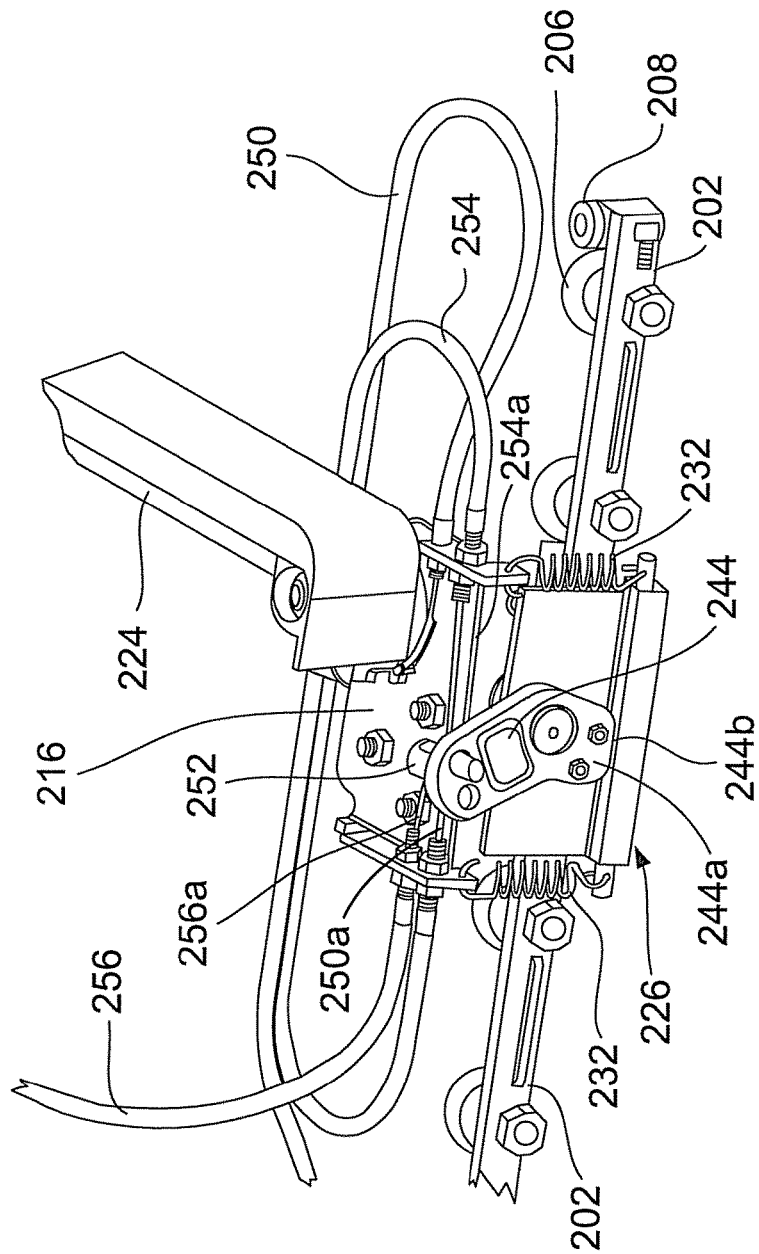
FIG. 20 is an inboard, side perspective view of another embodiment of the latching mechanism for use with the spoiler/support subsystem, where the latching mechanism is shown in an unlocked condition.
Figure 21:
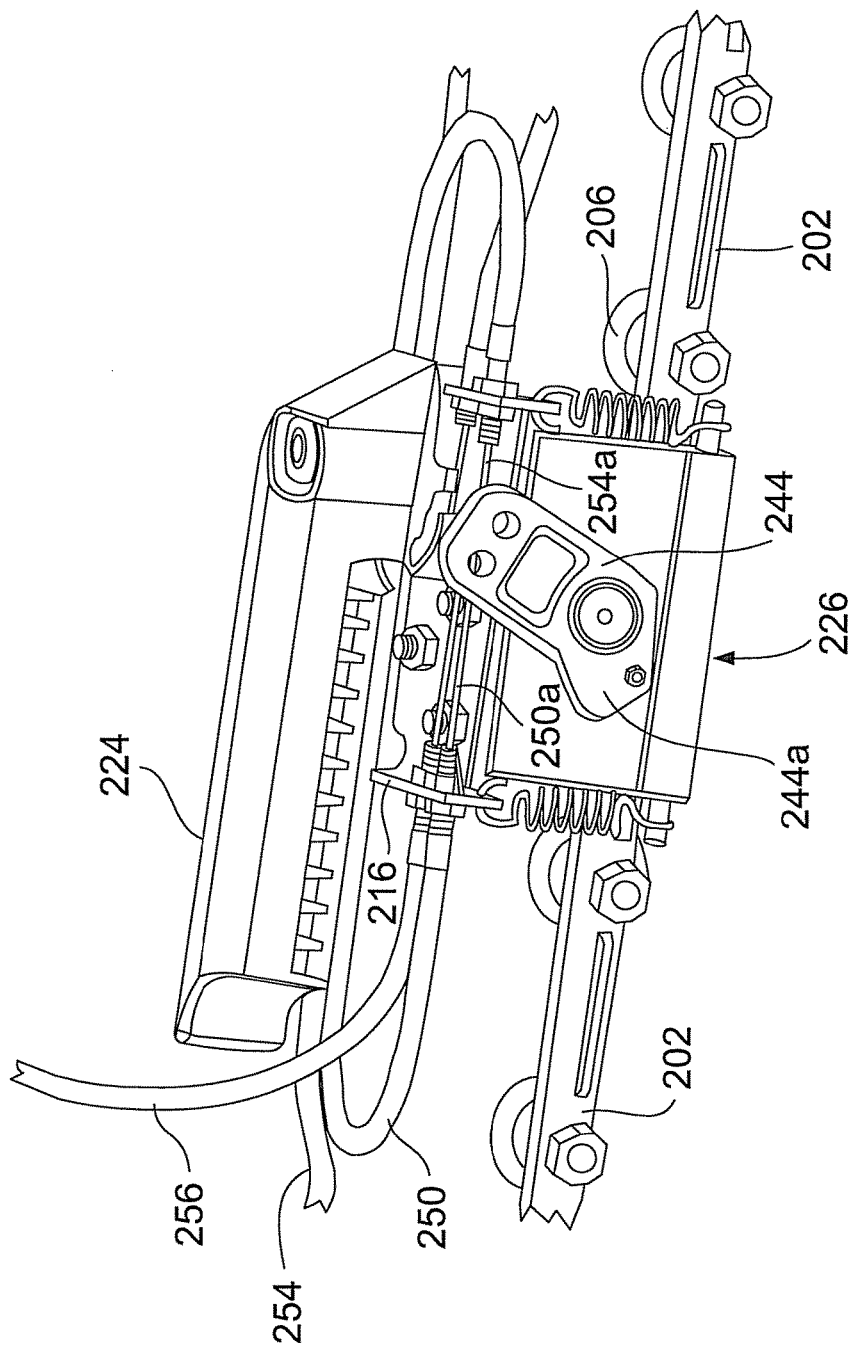
FIG. 21 is an inboard, side perspective view of the latching mechanism of FIG. 20 but with the latching mechanism in its locked position.

Referring to FIGS. 20 and 21, a first cable assembly 250 is secured to the lever 224 at one end and to the bracket 216 at a second end. An inner cable element 250a of first cable assembly 250 is secured to a projecting portion 252 of the camming element 244. Thus, movement in the clockwise direction of the lever 224 into the position shown in FIG. 20 causes rotation of the camming element 244 counterclockwise, which urges the movable element 226 into its lowered position, against the biasing force from the springs 232, as shown in FIG. 20. A first end of a cable element 254a of a second cable assembly 254 is also coupled to the projecting portion 252 of the camming element 244. A second end of the second cable assembly 254 is coupled to the camming element 244 of an identical latching mechanism 200 located at the opposite support track 40. Thus, as the first cable assembly 250 is urged via lever 224 to rotate the camming element 244 into the lowered position shown in FIG. 20, the camming element 244 of the latching mechanism 200 located on the other track 40 (not shown) will be simultaneously urged into the same position. A third cable assembly 256 has a cable element 256a coupled to the projecting portion 252 shown in FIG. 20 and also to the projecting portion 252 of the other latching mechanism 200 at the opposite support track 40, allows the lever 224 at the other latching mechanism 200 to simultaneously move its own camming element 244, and the camming element 244 shown in FIG. 20, into lowered positions when it is rotated to its open position. This is shown in the simplified diagram of FIG. 26. The second cable assembly 254 and the third cable assembly 256 can be routed within the support tracks 40 and, for example, along a forward wall of the pickup bed 44 with sufficient slack so that both of the latching mechanisms 200 can be moved to a rear end of the pickup bed 44. Alternatively, the second and third cable assemblies 254 and 256 can be routed through an interior area of the subsystem 34. Providing sufficient slack can be achieved by arranging a portion of each of the cable assemblies so that portions of each overlap as the spoiler/support subsystem 34 is moved to a position adjacent the rear spoiler portion 26. Alternatively, the second and third cable assemblies 254 and 256 can be routed through an interior area of the subsystem 34, and thus the system 10 is not limited to only one cable routing arrangement.

Thus, the configuration of the second and third cable assemblies 254 and 256 allows the latching mechanism 200 at either support track 40 to be used to simultaneously unlock and lock both of the latching mechanisms 200. The latching mechanisms 200 and their intercoupled cable assemblies thus form a single side release and locking system by which the user can easily and conveniently unlock the subsystem 34 to allow for adjustable positioning of the subsystem 34 along the support tracks 40, or to lock the subsystem 34 at a desired position along the support tracks 40. In this regard it will be appreciated that when the pin-like elements 246 are not perfectly aligned with a corresponding pair of holes 40a in the tracks 40 when the lever 224 is moved into its locked position, the pin-like elements will hold the movable element 226 in an almost fully lowered orientation. However, as the user begins to slide the subsystem 34 along the tracks 40, the pin-like elements 246 will eventually move into vertical alignment with a pair of the holes 40a, and when both of the pin-like elements 246 are vertically aligned over a pair of the holes 40 the movable element 226 will then be urged by the springs 232 into engagement with the pair of holes 40a. The vertically oriented wheels 206 and the horizontally oriented wheels 208 also help to provide smooth rolling movement of each one of the latching mechanisms 200 along their respective tracks and to prevent binding or "crabbing" of the subsystem 34 at opposite sides when repositioning it along the two parallel tracks 40.

The system 10, and particularly the subsystem 34 thereof, enables the system to readily support elongated articles such as kayaks, canoes, surfboards, long lengths of electrical or plumbing conduit or piping, ladders, and a wide variety of other articles which would be difficult or awkward to carry in the bed of a pickup truck because of the degree to which such articles would need to protrude out from the back of the bed. The ability to position the subsystem 34 at the rear of the bed 44 provides for a significantly increased longitudinal spacing between the front cross bar 20 and the upper wall portion 36, when supporting particularly elongated articles, for example articles that may longer than 4-5 feet in length. The system 10 enables especially long articles such as kayaks, canoes, etc., which often may range in length from 8-16 feet or more, and which would be difficult or impossible to securely support on a cross bars spaced only 2-3 feet apart, to be securely supported, and without requiring the article to hang significantly behind the tailgate 46 of the vehicle 14. It is an important feature of the system 10 that it enables particularly long articles to be more centrally positioned over the vehicle 14, while being supported at two points that are spaced apart at a greater distance than what would be possible with just cab roof mounted cross bars.

Another advantage of the system 10 is that by enabling elongated articles to be supported above the bed 44 of the vehicle 14, this leaves the entire bed of the vehicle free for supporting other cargo items. Since the subsystem 34 is supported from the tracks 40, the entire floor of the bed 44 is available for use in supporting articles when elongated items are being supported by the subsystem 34 and the cross bars 20-24. Still further, the subsystem 34 may be adjusted in its longitudinal position relative to the bed 44 without the need to remove other cargo items already positioned in the bed 44, provided of course that none of the cargo items in the bed are extending above the level of the tracks 40. The subsystem 34 is also entirely removable from the tracks 40 in the rare event the subsystem 34 would interfere with the placement of large cargo items in the bed 44.

Another advantage of the use of three cross bars 20-24 is that an article of medium length can be supported by the subsystem 34 and one of the cross bars 20-24, while the other two cross bars could be positioned as needed to support a different article carrier subsystem thereon, for example a bicycle rack. Thus, the use of three cross bars 20-24, in connection with the adjustably positionable subsystem 34, enables a plurality of differently sized articles to be transported simultaneously by the system 10, and thus provides a wide variety of flexibility for the user in positioning the various movable components of the system 10 as needed.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An article carrier system particularly adapted for use with a vehicle having a roof surface, the system comprising:
   a structural member supported from the roof surface adjacent a rear area of the roof surface and generally parallel to the roof surface, the structural member forming a panel-like, forward spoiler component having a rear edge;
   a pair of support tracks secured to a pair of cargo bed sidewalls of the vehicle and extending longitudinally along the cargo bed sidewalls;
   a combination spoiler/support subsystem having a panel-like surface with a forward edge having a contour generally matching a contour of the rear edge, and disposed at a common elevation with the structural member, and further being supported from the pair of support tracks and adjustably positionable along the pair of support tracks to provide a variable spacing between the structural member and the spoiler/support subsystem, to thus tailor the system to support articles of various lengths thereon; and
   the structural member and the spoiler/support subsystem able to be configured in abutting relationship with one another to form an appearance of a single, integrated, panel-like spoiler when the spoiler/support subsystem is positioned adjacent the structural member.

2. The system of claim 1, further comprising:
   a pair of roof mounted support tracks;
   at least one cross bar supported at opposite ends thereof to the pair of roof mounted support tracks so as to be elevated above the roof surface of the vehicle; and
   wherein the structural member extends perpendicularly between the roof mounted support tracks.

3. The system of claim 2, further comprising a pair of cross bars supported at opposite ends thereof to the pair of roof mounted support tracks so as to be elevated above the roof surface; and
   wherein the structural member comprises a rear spoiler member.

4. The system of claim 2, wherein the at least one cross bar has a pair of end supports at its opposite ends that are movable between a first position, wherein the at least one cross bar is elevated at a first position above the roof surface, and a second position wherein the at least one cross bar is elevated at a second position above the roof surface which is different than the first position.

5. The system of claim 2, wherein the first position places the at least one cross bar at least one of at or below an upper surface of each one of the pair of roof mounted support tracks, and wherein the second position places the at least one cross bar above the upper surfaces of the pair of roof mounted support tracks.

6. The system of claim 2, further comprising a front air dam formed along a forward area of the roof surface, the front air dam being disposed between the pair of roof mounted support tracks to form an appearance of an integral portion of the pair of roof mounted support tracks.

7. The system of claim 2 wherein each said support track of the pair of roof mounted support tracks has a first portion which extends along a respective one of a pair of A-pillars of the vehicle.

8. The system of claim 7, wherein the first portion of each one of the pair of roof mounted support tracks includes slots through which an article securing implement may be secured to assist in securing articles to the pair of roof mounted support tracks.

9. The system of claim 2, wherein each said roof mounted support track of the pair of roof mounted support tracks includes a rearward, downwardly projecting portion which extends downwardly toward a respective one of the cargo bed sidewalls.

10. The system of claim 9, wherein each one of the rearward, downwardly projecting portions includes an opening formed therein through which an article securing implement may be routed to assist in securing articles to the pair of roof mounted support tracks.

11. The system of claim 10, wherein the spoiler/support subsystem includes:
    an upper wall portion having a width substantially the same as the rear spoiler member;
    a pair of sidewall portions extending downwardly toward the cargo bed sidewalls; and
    wherein the sidewall portions each have a contour which matches a contour of an associated one of the rearward, downwardly projecting portion to thus form an appearance of a single, integrated sidewall.

12. The system of claim 1, wherein the spoiler/support subsystem includes a pair of sidewall portions each having a latching mechanism, and wherein each one of the support tracks includes a plurality of features formed there along with which the latching mechanism is able to engage and thus be secured in a stationary orientation along the pair of support tracks.

13. The system of claim 12, wherein the latching mechanisms are interconnected by cable assemblies routed at least partially within spoiler/support subsystem.

14. The system of claim 12, wherein locking or unlocking one of the latching mechanisms at one of the pair of sidewall portions operates to simultaneously lock or unlock the latching mechanism at the other one of the pair of sidewall portions.

15. The system of claim 14, wherein each one of the latching mechanisms incorporates a pivotally mounted lever by which a user can lock or unlock the latching mechanism from its respective one of the second pair of support tracks.

16. The system of claim 1, further comprising a light integrated into the spoiler/support subsystem.

17. The system of claim 13, wherein each one of the latching mechanisms includes:
    a carriage bar having a plurality of wheels for facilitating rolling movement of the locking mechanism along its respective said one of the second pair of support tracks;
    a movable element;

at least one pin-like element projecting from the movable element;

a camming element for moving the movable element between first and second positions;

a lever operatively coupled to the camming element for urging the camming element between the first and second positions; and wherein in the first position of the camming element, the camming element positions the pin-like elements in holes in the second pair of support tracks; and wherein in the second position of the camming element, the camming element positions the pin-like elements apart from the holes such that the locking mechanisms are free to be moved along the second pair of support tracks.

18. An article carrier system particularly adapted for use with a pickup truck having a roof and a truck bed, with the truck bed having a pair of parallel truck bed sidewalls which help to form the truck bed, the system comprising:

a first pair of support tracks secured to the roof and extending longitudinally along the roof;

each support track of the first pair of support tracks including a rearward, downwardly projecting portion which extends downwardly toward a respective one of the truck bed sidewalls, and which has a first contour;

a rear spoiler portion coupled to each of the first support tracks and extending therebetween adjacent a rear area of the roof;

a second pair of support tracks secured to a pair of truck bed sidewalls of the pickup truck and extending longitudinally along the bed sidewalls;

a combination spoiler/support subsystem supported from the second pair of support tracks and adjustably positionable along the second pair of support tracks to provide a variable spacing between the rear spoiler portion and the spoiler/support subsystem, to thus tailor the system to support articles of various lengths thereon;

the combination spoiler/support subsystem having side wall portions which each have a second contour complementary to the first contour, which enables the side wall portions to be positioned closely adjacent the rearward, downwardly projecting portions of the first pair of support tracks, wherein the rear spoiler portion and the spoiler/support subsystem form an appearance of being a single, integrated spoiler when the spoiler/support subsystem is positioned next to the rear spoiler portion; and wherein the spoiler/support subsystem includes:

an upper wall portion having a width substantially the same as the rear spoiler portion;

a pair of sidewall portions extending downwardly toward the truck bed sidewalls; and wherein the sidewall portions each have a contour which matches a contour of an associated one of the rearward, downwardly projecting portion to thus form an appearance of a single, integrated sidewall.

19. The system of claim 18, further comprising:

a front air dam secured to the roof; and wherein each said support track of the first pair of support tracks has a first portion which extends along a respective one of a pair of A-pillars of the pickup truck; and wherein the front air dam extends between the first pair of support tracks to provide an appearance of being integrally formed with the first pair of support tracks.

20. An article carrier system particularly adapted for use with a vehicle having a cargo bed, the system comprising:

a pair of support tracks secured to a pair of cargo bed sidewalls of the vehicle and extending longitudinally along the cargo bed sidewalls;

a generally inverted U-shaped combination spoiler/support subsystem supported from the pair of support tracks at its opposite ends and adjustably positionable along the pair of support tracks; and the spoiler/support subsystem having a single side release subsystem for latching and unlatching the opposite ends from the support tracks, the single side release subsystem including:

first and second movable members disposed adjacent the opposite ends of the spoiler/support subsystem, and being movable using at least one hand of a user between a locked position and an unlocked position;

first and second latching subsystems disposed at the opposite ends of the spoiler/support subsystem, and both of the first and second latching subsystems being movable between latched and unlatched positions in response to movement of either one of the first and second movable members between the locked and unlocked positions, for engaging with portions of the tracks to hold the spoiler/support subsystem stationary on the tracks when in the latched positions, and to enable adjustable positioning along the tracks when in the unlatched positions.

* * * * *